April 26, 1955 E. S. COOK 2,707,134
FLUID PRESSURE BRAKE EQUIPMENT
Filed Dec. 20, 1950 3 Sheets-Sheet 3

INVENTOR.
Earle S. Cook
BY Frank E. Miller
ATTORNEY

United States Patent Office 2,707,134
Patented Apr. 26, 1955

2,707,134

FLUID PRESSURE BRAKE EQUIPMENT

Earle S. Cook, Forest Hills, Pa., assignor to Westinghouse Air Brake Company, a corporation of Pennsylvania Application December 20, 1950, Serial No. 201,846

43 Claims. (Cl. 303—35)

This invention relates to fluid pressure brake equipment and more particularly to the railway type adapted to be controlled by variations in pressure in a brake pipe.

The post war reconstruction in Europe is leading toward international movement of railway cars in view of which it is desired to provide a new brake controlling valve device which may be employed on all cars of the different nations and which for the present will operate in harmony with the various brake controlling valve devices now in use on the railroads of the different nations.

The brake controlling valve devices now in use in Europe are of the graduated release type and not required to select between service and emergency rates of brake pipe reduction as in the United States of America. Moreover, perhaps fifty to sixty percent of the cars being operated in trains in Europe are not provided with any brake equipment at all or with brake equipment which is in an inoperative condition and it is customary to operate trains including such unbraked cars bunched together making it difficult to transmit a reduction in brake pipe pressure from one braked car to another through a train for applying brakes.

One object of the invention is therefore the provision of an improved brake controlling valve device particularly adapted for use on European railway cars.

Another object of the invention is the provision of an improved graduated release type of brake controlling valve device for European service having quick service means for positively transmitting in a desired minimum of time a reduction in brake pipe pressure from one braked car to another throughout a train such as above described, and for positively ensuring operation of the respective brake controlling valve devices; which provides for maintenance of brake cylinder pressure against leakage; rapid initial charging of the brake equipment on a train so as to require a minimum of time to prepare a train for movement; and which also provides for, normally, prevention of overcharge of brake equipment, and for substantial uniform recharging of brake equipments and uniform release of brakes on all cars of a train following a brake application.

Other objects and advantages will become apparent from the following more detailed description of the invention.

In the accompanying drawings, Figs. 1–1A, when the right-hand edge of Fig. 1 is matched to the left-hand edge of Fig. 1A, is a diagrammatic view of a fluid pressure brake equipment embodying the invention.

DESCRIPTION

Figure 1:
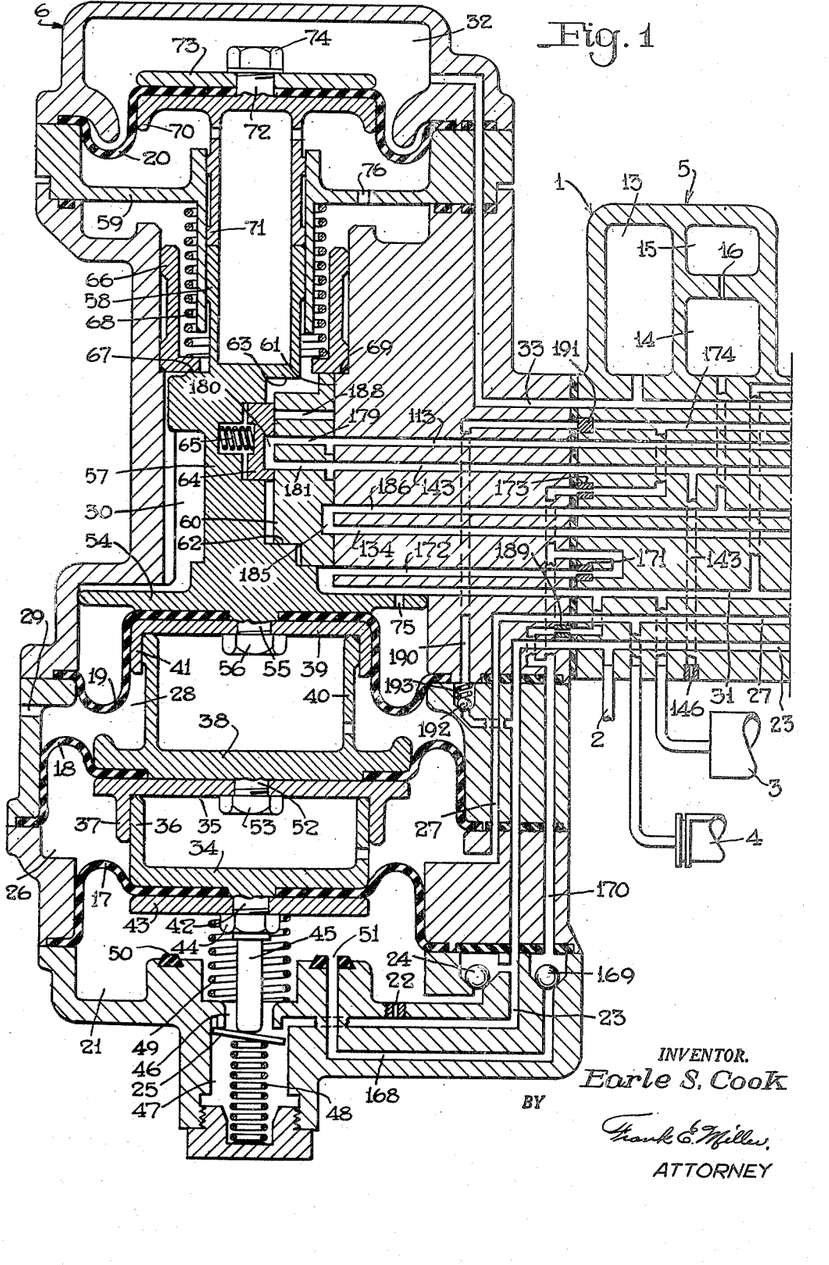
Figure 1A:
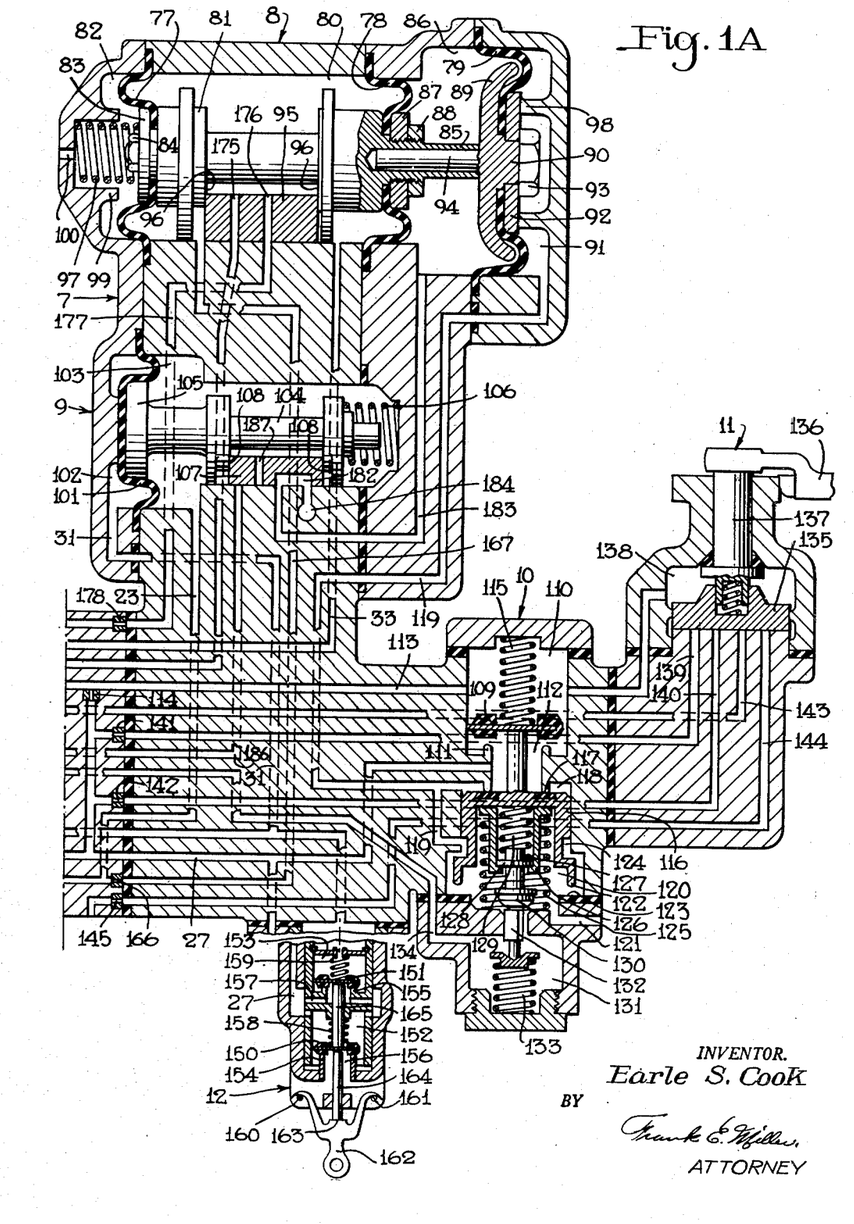

As shown in the drawing, the brake equipment embodying the invention, comprises a brake controlling valve device 1 adapted to operate in response to a reduction in pressure in a brake pipe 2 to control supply of fluid under pressure from a supply reservoir 3 to a brake cylinder device 4 to apply brakes on a car and adapted to operate in response to charging of said brake pipe with fluid under pressure to charge said supply reservoir with fluid under pressure and to release fluid under pressure from said brake cylinder device.

The brake controlling valve device 1 comprises a pipe bracket 5 to which the brake pipe 2, supply reservoir 3 and brake cylinder device 4 are adapted to be connected and on one face of which is mounted a graduated control portion 6 and on another face of which is mounted a portion 7 including a control reservoir cut-off valve device 8, a quick service valve device 9, a brake cylinder inshot valve device 10, a service selector valve device 11 and a combined brake cylinder and supply reservoir release valve device 12.

Cast within the pipe bracket 5 is a control reservoir or chamber 13, a primary quick service reservoir 14 and a secondary quick service reservoir 15 which is in constant communication with the reservoir 14 through a port 16 of relatively small flow capacity.

The graduated control portion 6 of the brake controlling valve device comprises a casing containing a pile of four coaxially arranged, spaced apart flexible diaphragms 17, 18, 19 and 20 arranged in the order identified and each clamped around its marginal edge in the casing, the diaphragm 18 being of greater diameter than the others which are all of substantially the same diameter. At the outer face of diaphragm 17 is a brake pipe control chamber 21 in constant communication with the brake pipe 2 through the smallest practical size of choke 22 and a passage 23, said chamber also being adapted to be connected to said passage past a check valve 24, arranged to permit flow of fluid under pressure only in the direction from said chamber to said passage, and an overcharge preventing check valve 25 for limiting rate of charging of said chamber with fluid under pressure from said brake pipe. The check valves 24 and 25 are shown in the drawing, respectively, as of the ball and disc types and it will be noted that they control parallel arranged communications between chamber 21 and passage 23.

Between the diaphragms 17 and 18 is a chamber 26 which is in constant communication with the brake cylinder device 4 via passage 27. Between diaphragms 18 and 19 is a chamber 28 in constant communication with atmosphere through a passage 29, while a chamber 30 formed between the diaphragms 19 and 20 is in constant communication with the supply reservoir 3 via passage 31. At the outer face of diaphragm 20 is a control chamber 32 which is in constant communication with the control reservoir 13 via passage 33.

Chamber 26 contains two follower plates 34 and 35 arranged coaxial to and engaging the adjacent faces of diaphragms 17 and 18 and having telescoped aligning portions 36 and 37, respectively, the portion 36 engaging the plate 35 to provide a substantially rigid strut between the two diaphragms. Similar plates 38, 39 with telescoped aligning portions 40, 41, respectively, are disposed in chamber 28 with said plates in coaxial relation to and engaging the diaphragms 18 and 19, respectively, forming a substantially rigid strut connection between said diaphragms.

The plate 34 has a stud 42 extending through a central opening in diaphragm 17 and in a follower plate 43 engaging the opposite face of said diaphragm in chamber 21 and a nut 44 on said stud engaging the latter plate clamps the central portion of said diaphragm between said plates. A pin extension 45 of stud 42 projects through chamber 21 and an opening 46 encircled by the casing seat for the disc type check valve 25 into contact with said check valve for unseating same upon movement of the pin against said check valve. The check valve 25 is contained in a chamber 47 to which passage 23 is constantly open and which contains a light bias spring 48 for urging said check valve to its seat. The cross-sectional area of pin 45 is only a fraction of that of opening 46 so as not to materially restrict flow of fluid under pressure between chambers 21 and 47. A spring 49 in chamber 21 exerts a chosen force against follower plate 43 and thereby diaphragm 17 for reasons which will be later brought out. A sealing gasket 50 contained in chamber 21 is fixed in the casing around the opening 46 for contact by the follower plate 43 in an extreme lower position thereof to close communication between the portion of said chamber outside of said gasket and said opening. At one side of opening 46 a port 51 through the gasket normally open to chamber 21 is adapted to be closed by the plate 43 contacting said gasket over the end of said opening.

The follower plate 38 has a central stud 52 extending through plate 35 and a nut 53 on said stud clamps said plates to opposite sides of diaphragm 18 centrally thereof.

A follower plate 54 contained in chamber 30 engages the adjacent face of diaphragm 19 and has a stud 55 extending centrally through said diaphragm and plate 39 and a nut 56 on said stud engaging the latter plate clamps said plates to opposite sides of diaphragm 19. The plate 54 is in the form of an enlargement of one end of a stem 57 disposed in chamber 30 with its opposite end 58 slidably mounted in a bore in a portion 59 of the casing. A main slide valve 60 slidably mounted on a valve seat 61 in chamber 30 is loosely mounted between two spaced apart shoulders 62, 63 provided on the stem 57, while slidably mounted on said valve and disposed in a recess in said stem for movement therewith is an auxiliary slide valve 64. A light spring 65 interposed between stem 57 and the auxiliary slide valve 64 constantly urges said slide valve against its seat on the main slide valve 60. Encircling the end 58 of stem 57 and slidably mounted in the casing is a plunger 66 one end of which is arranged to engage a shoulder 67 on the stem and the adjacent end of the slide valve 60. A spring 68 acting on the plunger 66 is provided to oppose movement of stem 57 and slide valve 60 out of the normal release position in which they are shown in the drawing and which is defined by contact of said plunger with a shoulder 69 in the casing.

A follower plate 70 contained in chamber 30 and having a stem 71 projecting therefrom and slidably mounted in the casing portion 59 for contact with the adjacent end 58 of stem 57 engages the adjacent face of diaphragm 20 centrally thereof. The plate 70 has a stud 72 extending through diaphragm 20 and a follower plate 73 engaging the opposite side of said diaphragm and a nut 74 on said stud clamps the two plates to opposite faces of said diaphragm.

It is to be noted that the spaces at the adjacent faces of diaphragms 19 and 20 constitute parts of chamber 30 which contain the slide valves 60 and 64, being in constant communication therewith through ports 75, 76 in the follower plate 54 and casing portion 59, respectively.

The control reservoir cut-off valve device 8 comprises three spaced apart coaxially arranged flexible diaphragms 77, 78 and 79 clamped around their edges in the casing, the diaphragms 77 and 78 being of the same diameter and smaller than the diameter of diaphragm 79.

The two diaphragms 77 and 78 cooperate to form a chamber 80 between them which is constantly open to the control reservoir passage 33 and said diaphragms are held in spaced apart relation by engagement with opposite ends of a plunger 81. One end of the plunger 81 is reduced to extend centrally through diaphragm 77 into a chamber 82 and through a plate 83 in said chamber engaging the opposite side of said diaphragm and a nut 84 on the reduced portion of said plunger engaging the latter plate clamps the central portion of said diaphragm to said end of said plunger. The opposite end of the plunger 81 is also reduced to form an axially arranged portion 85 extending centrally through the diaphragm 78 into a chamber 86 formed between the diaphragms 78, 79. A plate 87 in chamber 86 engages the adjacent face of diaphragm 78 and a nut 88 on the portion 85 clamps the central portion of diaphragm 78 between the adjacent end of plunger 81 and plate 87. A follower plate 89 in chamber 86 engaging the adjacent face of diaphragm 79 has a stud 90 projecting from one face thereof through an opening provided centrally of diaphragm 74 into a chamber 91 at the opposite side of said diaphragm. A plate 92 in chamber 91 engages the adjacent face of diaphragm 74 and a nut 93 on stud 90 clamps the central portion of said diaphragm between the plates 89 and 92. Projecting from the opposite face of plate 89 into telescopic guiding relation with portion 85 is a pin 94. A slide valve 95 contained in chamber 80 is mounted between two spaced shoulders 96 on plunger 81 for movement therewith.

A spring 97 in chamber 82 acts on follower plate 83 for urging the several parts of the cut-off valve device 8 to a normal or charging position in which they are shown in the drawing defined by contact between the portion 85 of plunger 81 contacting the plate 89 and contact between the plate 92 and a casing stop 98. A second or cut-off position of slide valve 95 is adapted to be defined by contact between follower plate 83 and a casing stop 99. Chamber 82 is in constant communication with atmosphere through a port 100.

The quick service valve device 9 comprises a flexible diaphragm 101 clamped around its edge in the casing.

At one side of diaphragm 101 there is a chamber 102 in constant communication through passage 31 with the supply reservoir 3, while at the opposite side is a chamber 103 in constant communication through passage 23 with brake pipe 2. A stem 104 in chamber 103 has on one end a head 105 engaging the adjacent face of diaphragm 101 while acting upon the opposite end of said stem with a chosen pressure is a spring 106. A slide valve 107 in chamber 103 is mounted between two spaced apart shoulders 108 on the stem 104 for movement therewith.

The brake cylinder inshot valve device 10 comprises a check valve 109 contained in a chamber 110 and arranged to cooperate with a seat 111 to close communication between said chamber and a bore 112, said chamber being open through a passage 113 to the seat of the main slide valve 60 in the graduated control portion 6 and the bore 112 being open to passage 27 and thereby the brake cylinder device 4. The passage 113 is constantly open to passage 27 through a slow application choke 114 adapted to control the rate of brake application on freight trains. A spring 115 in chamber 110 acts on the check valve 109 for urging it toward its seat 111.

Slidably mounted in the casing below the bore 112 is a piston 116 one face of which is arranged to cooperate with an annular seat 117 encircling the lower end of said bore for closing communication between said bore and a chamber 118 encircling said seat and open to a passage 119 leading to diaphragm chamber 91 in the cut-off valve device 8. At the opposite side of piston 116 is a chamber 120 in constant communication with atmosphere through a vent port 121, said opposite side of said piston having an annular valve 122 arranged to seal against a gasket 123 in a position in which said piston is out of contact with seat 117. In the peripheral surface of piston 116 there is an annular groove 124 adapted when said piston is in contact with seat 117 to open passage 119 to atmosphere via chamber 120, the sealing of the piston valve 122 with gasket 123 closing such communication.

The piston 116 is cup-shaped with the closed end arranged for cooperation with seat 117 and disposed within said piston and held against said closed end by a spring 125 is an oppositely arranged cup-shaped element 126, said spring exerting a chosen degree of force through said element against the piston 116 urging said piston toward seat 117. A plunger 127 disposed within the element 126 and depending through an opening in the closed end thereof has a collar 128 for engaging said element around said opening and is urged into such engagement by a spring 129. The plunger 127 is arranged to contact a valve 130 contained in chamber 120 for seating said valve upon downward movement of piston 116. The valve 130 controls communication between a chamber 131 and chamber 120 and is provided with a fluted stem 132 extending into chamber 131 which contains a spring 133 acting on said stem for unseating said valve. The chamber 131 is open through a passage 134 to the seat of the main slide valve 60 in the graduated control portion 6.

The service selector valve device 11 is manually adjustable to provide for different rates of application and release of brakes on a car according to the type of service in which the car is to be operated, that is, freight service, passenger service or express service. To this end the selector valve device comprises a rotary valve 135 having three different positions, namely, freight, passenger and express as indicated by legends in Fig. 2, and is adapted to be turned to these different positions by a manually operable handle 136 connected to said valve through an operating stem 137. The rotary valve 135 is contained in a chamber 138 to which passage 113 is connected. Connected to the seat of rotary valve 135 are application passages 139, 140 which are also connected to the brake cylinder passage 27 through chokes 141 and 142, respectively, and release passages 143 and 144 also connected, respectively, to the seat of the main slide valve 60 of the graduated control portion 6 and to atmosphere via choke 145 in the pipe bracket 5.

Figure 2:
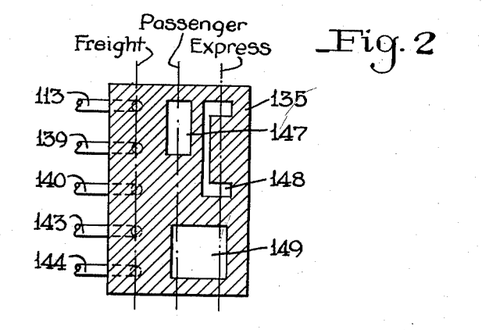
Fig. 2 is a diagrammatic development view of a selector valve device shown in section in Fig. 1A.

In freight position of the service selector device 11 the passages 139, 140, 143 and 144 are all lapped by the rotary valve 135 whereby, as will be explained in detail later, the rate of a brake application will be controlled solely by choke 114 and the rate of brake release will be controlled solely by a choke 146 in an atmospheric communication of passage 143 in bracket 5. In passenger position of the rotary valve 135, a cavity 147 therein opens a communication between passages 113 and 139 whereby choke 141 is connected in parallel with the freight application choke 114, the combined capacities of the two chokes being effective to control the rate of brake application in passenger service. In express position of the rotary valve 135 a cavity 148 therein connects passage 113 with passage 140 whereby choke 142 is connected in parallel with the freight application choke 114 to control the rate of brake application for express service. In both the passenger and express positions of rotary valve 135 a cavity 149 in said valve connects passages 143 and 144 whereby choke 145 is connected in parallel with the freight release choke 146 to regulate the rate of brake release in passenger and express services.

The combined brake cylinder and supply reservoir release valve device 12 comprises two coaxially arranged, spaced apart check valves 150, 151 contained in chambers 152, 153 and arranged to move in the same direction into contact with seats 154, 155, respectively. The chamber 152 is in constant communication with the brake cylinder device 4 via passage 27 and check valve 150 controls communication between said chamber and an atmospheric passage 156 opening to said valve within its seat 154. The chamber 153 is in constant communication with supply reservoir 3 via passage 31 and valve 151 controls communication between said chamber and a passage 157 connected to the brake cylinder passage 27. Springs 158, 159 contained in chambers 152, 153, act on check valves 150, 151 for urging them to their seats 154, 155, respectively.

Depending from the casing of the release valve device 12 and normally supported on two spaced apart pins 160, 161 therein is a lever 162 which is rockable in either one direction or the opposite direction on one or the other of said pins for moving a portion 163 of said lever intermediate of said pins in the direction of the check valves 150, 151. A pin 164 suitably guided in the casing for engagement at one end with the seated side of check valve 150 within its seat 154 is supported at its opposite end on the portion 163 of lever 162. With the lever engaging pins 160 and 161 and engaged by pin 164 the pin 164 will be just out of contact with check valve 150 to permit seating thereof by spring 158. Slidably mounted in the casing between the two check valves 150, 151 and in coaxial relation therewith is another pin 165 of a length somewhat less than the distance between said check valves when seated, said pin being arranged for operation by check valve 150 after a chosen degree of unseating thereof to engage the check valve 151 for unseating it upon further unseating movement of check valve 150. It will thus be seen that by limited rocking of lever 162 only the check valve 150 will be unseated but upon further rocking of said lever the check valve 151 will also be unseated.

OPERATION

With the brake equipment void of fluid under pressure all parts will assume the position in which they are shown in the drawing except the manually adjustable service selector valve device 11 which for the time being will be assumed to be in freight position, as shown in the drawing.

*Initial charging of the brake equipment*

To initially charge the brake equipment on a train, as well as in recharging the brake equipment to effect a release of brakes after a brake application, it is customary to move the usual engineer's brake valve device (not shown) first to a release position for supplying fluid at relatively high pressure directly from the usual main reservoir on the locomotive to the brake pipe 2 on the locomotive, and then after the lapse of a period of time, which varies according to different conditions, the brake valve device will be moved to running position to reduce the pressure of further supply of fluid to said brake pipe to the normal degree which it is desired to carry. The pressure in the brake pipe on perhaps the first fifteen cars of a train will therefore be initially increased to a degree in excess of the degree normally carried, the degree of such overcharge in the brake pipe being greatest on the car coupled to the locomotive and decreasing from car to car back from the locomotive, and the above mentioned time which the brake valve device is allowed to remain in release position is intended to be so limited as to prevent overcharging of the brake equipment on the cars on which the brake pipe is momentarily overcharged.

When fluid under pressure is supplied to the brake pipe 2, as above described, such fluid will be supplied to passage 23 and thence to chamber 103 in the quick service valve device 9, also through a relatively small overcharge dissipating choke 166 and a passage 167 to valve chamber 80 in the control reservoir cut-off valve device 8, and also to chamber 21 in the graduated control portion 6. From chamber 21 such fluid will flow through port 51 in gasket 50, a passage 168, past a check valve 169, through a passage 170, a normal charging choke 171 and a passage 172 to valve chamber 30 and also from passage 170, through a fast charging choke 173, a passage 174 and a port 175 in slide valve 95 of the control reservoir cut-off valve device 8 to chamber 80 therein, it being noted that chamber 80 is thus supplied with fluid under pressure through both the overcharge dissipating choke 166 and the fast charging choke 173. From chamber 80 fluid under pressure will flow directly through passage 33 to the control reservoir 13 and diaphragm chamber 32 and also through a port 176 in slide valve 95, a passage 177, and a choke 178 to the supply reservoir passage 31. At the same time, fluid under pressure supplied to valve chamber 30 in the graduated control portion 6 via the normal charging choke 171 will flow to passage 31 and this fluid, as well as that supplied to said passage from chamber 80 in the control reservoir cut-off valve device 8, will flow to the supply reservoir 3, to chamber 153 in the combined brake cylinder and supply reservoir release valve device 12 and to chamber 102 in the quick service valve device 9 to charge said reservoir and chamber.

The choke 178 is provided to so limit flow of fluid under pressure from valve chamber 80 to the supply reservoir 3, as just described, that pressure of fluid in the control reservoir 13 and diaphragm chamber 32 will increase substantially in unison with that in valve chamber 80, the remainder of the fluid supplied to chamber 80 flowing through said choke to the supply reservoir 3 to charge same.

It will be noted that the pressure of fluid thus supplied to diaphragm chamber 32 acting on diaphragm 20 will oppose pressure of fluid in chamber 21 acting on diaphragm 17 which is of substantially the same area as diaphragm 20. It will also be noted that the action of supply reservoir pressure in chamber 30 on diaphragm 19 is substantially counterbalanced by the same pressure in said chamber acting on diaphragm 29 which is of substantially the same area as diaphragm 19. Moreover the brake cylinder device 4 and connected chamber 26 between diaphragms 17 and 18 are both initially at atmospheric pressure, as above assumed, and in fact are open to atmosphere with the graduated control portion 6 in the position in which it is shown in the drawing via passage 27, choke 114, passage 113, a port 179 in the main slide valve 60, a cavity 180 in the auxiliary slide valve 64, a port 181 in said main slide valve, passage 143 and the choke 146. Thus in initial charging, it will be seen that the only fluid pressures exerting a controlling force on the pile of diaphragms are the opposing pressures in chambers 32 and 21.

Upon initiating initial charging of the brake pipe 2, the higher than normal brake pipe pressure obtained on cars adjacent the locomotive will start to rush from check valve chamber 47 into chamber 21 and increase the pressure therein so rapidly as to create a force on diaphragm 17 which will move the diaphragm pile upwardly from the position in which it is shown in the drawing against plunger 66 and spring 68 which are provided to prevent overcharging of the supply reservoir 3 and control reservoir 13, as will be described in detail later.

As the diaphragm pile thus moves upwardly spring 48 will move the check valve 25 toward its seat and on cars near the locomotive the check valve 25 will actually initially seat in which case the supply of fluid under pressure to chamber 21 will be momentarily limited to the flow capacity of the relatively small choke 22. The fluid under pressure thus supplied to chamber 21 will however be promptly dissipated through the normal charging choke 171 to the supply reservoir 3 and through the fast charging choke 173 to valve chamber 80 in the control reservoir cut-off valve device 8 and thence will become effective in the control reservoir 13 and diaphragm chamber 32. The flow capacity of choke 22 is however inadequate to maintain sufficient pressure in chamber 21 to hold the diaphragm pile in the position permitting valve 25 to remain seated against the opposing pressure of spring 68 and increasing control reservoir pressure in chamber 32, as a result of which, said opposing pressure will move the diaphragm pile down and crack open the check valve 25 to increase the supply of fluid under pressure to chamber 21 to an extent which will provide sufficient pressure therein to balance said opposing pressure. As the pressure in chamber 32 then builds up the pressure in chamber 21 will also build up and reduce the differential between the pressures in chamber 21 and the brake pipe 2 and as this occurs spring 68 will move the diaphragm pile downwardly to open the valve 25 to a greater extent to correspondingly increase the supply of fluid under pressure to chamber 21. The check valve 25 will thus be gradually opened to an increasing degree where the resultant increased rate of supply of fluid under pressure to chamber 21 over that through choke 22 will provide a pressure therein against the outflow of fluid under pressure to the supply reservoir 3, control reservoir 13 and diaphragm chamber 32 which will counterbalance the increasing pressure of fluid in chamber 32 and the pressure of spring 68.

Where the degree of overcharge of brake pipe is less, as on cars further back from the locomotive, the valve 25 may initially fully close as on cars right at the locomotive, but will be promptly reopened to an extent necessary to maintain sufficient pressure in chamber 21 to counterbalance opposing pressure of spring 68 and increasing pressure of fluid in chamber 32 the same as on cars right at the locomotive.

Further back in the train where the brake pipe may only become charged to the normal pressure carried, the diaphragm pile may be moved by such pressure upwardly against spring 68 to a position where the check valve 25 will be sufficiently closed to so restrict supply of fluid under pressure to chamber 21 as to limit the pressure obtained therein in accordance with the build up in chamber 32, and finally toward the rear end of the train where the pressure in the brake pipe will only gradually increase, the increase in pressure in chamber 32 with respect to that in chamber 21 may be such that the pile of diaphrams will be held by spring 68 in the position in which they are shown in the drawing with the check valve 25 fully open.

When the engineer's brake valve device is operated to reduce the pressure of fluid supplied to the brake pipe to the normal degree the rate of supply of fluid under pressure to chamber 21 in the brake equipment will be correspondingly reduced and at the front of the train the diaphragm pile will be operated by spring 68 and pressure in chamber 32 to open the check valve 25 to a greater degree as necessary in accordance with the reduced brake pipe pressure to maintain the balance between pressure of fluid in chambers 21 and 32, and finally when the control reservoir pressure in chamber 32 becomes increased to within about three pounds of the pressure of fluid in the brake pipe, spring 68 will move the diaphragm pile to normal position, in which it is shown in the drawing, as will also occur on any cars further to the rear in the train when this same relationship of pressures is obtained.

With the check valve 25 unseated sufficiently it will not control the rate of charging of the brake equipment, said rate being then controlled by the combined flow capacities of normal charging choke 171, fast charging choke 173 and the overcharge dissipating choke 166 (which is always effective regardless of the position of a car in a train) and it is desired to point out that the combined flow capacities of said chokes will permit charging of a brake equipment at a much faster rate than ever before employed.

In charging the brake equipments of a train, it will now be seen that near the front of the train the rate at which charging of the brake equipments will occur is limited to the flow capacity of choke 22 and by the check valve 25 which is gradually opened by spring 68 in accordance with the increase in pressure in chamber 32 to maintain a substantially constant rate of charging, while to the rear in the train where the brake pipe is not overcharged the charging rate will be limited to the capacity of chokes 171, 173 and 166.

The length of time which the brake pipe at the front of the train is overcharged, as above described, is intended to be so limited that the check valve 25 will prevent overcharging of the supply and control reservoirs at the front of the train, but still sufficient to permit charging of said reservoirs to a pressure substantially equal to normal brake pipe pressure by the time the pressure of fluid supplied to the brake pipe is reduced to normal. The check valve 25 thus not only prevents overcharging of the brake equipment at the head of the train, but also, due to its limiting the amount of fluid under pressure taken from the brake pipe for charging said reservoirs, causes a greater amount of fluid under pressure to be more quickly forced back through the train for charging the brake equipments there through chokes 171, 173 and 166; the combined restricting effect of such chokes being such as to provide as nearly as possible a uniform charging of such brake equipments at as rapid a rate as possible. The brake equipments at the rear of the train will therefore be charged substantially uniformly at a maximum possible rate and those at the front of the train at a maximum permissible rate as governed by opposing pressures of fluid in chambers 21 and 32 which normally will prevent overcharging of the control and supply reservoirs at the front of the train.

In European service, a train may be made up of freight, express and passenger cars having different sizes of supply reservoirs 3, as for example, the volume of a supply reservoir on a passenger or express car may be three times that on a freight car, and uniform charging, just described, of such mixed brake equipments may be very desirable, this uniform charging resulting from use of choke 173, since whenever it becomes a controlling factor in charging it may so limit the amount of fluid under pressure drawn off from the brake pipe to charge a respective equipment as to hasten flow of fluid under pressure toward the rear of the train to charge the other brake equipments.

However, uniform charging may not be considered essential in initially charging a train in which case the fast charging choke 173 may be omitted. With the choke 173 omitted the graduated control portion 6 upon movement to or near its normal position will permit charging of a brake equipment substantially in unison with increase in pressure in the brake pipe, the faster rate of supply to the control reservoir 13 and diaphragm chamber 32 opening the check valve 25 to a greater extent than when the choke 173 were used, with the result, that in a train the brake equipments would become fully charged serially from front to rear of the train. The initial charging time of a train with or without the choke 173 will however be substantially the same.

If during charging of a train the engineer's brake valve device should be allowed to remain for too long a time in the position for supplying fluid under pressure directly from the main reservoir to the brake pipe 2, then there is the possibility that one or more brake equipments adjacent the locomotive will become slightly overcharged. This is undesirable for it is necessary that the pressure in control reservoir 13 and chamber 32 be equal to normal brake pipe pressure at the end of charging for properly controlling subsequent operation of the graduated control portion 6. If slight overcharging does occur however, then when the brake pipe pressure is reduced to normal the excess fluid in the control reservoir 13 and supply reservoir 3 will be dissipated back to brake pipe 2 through chamber 80 of the control reservoir cut-off valve device 8 and the overcharge dissipating choke 166. This is the only purpose of the communication including choke 166, although as above described some inconsequential amount of fluid under pressure from the brake pipe will flow through said choke for charging purposes. Except for overcharge dissipation however the communication including choke 166 could be dispensed with.

In charging the brake equipment fluid under pressure will be supplied directly from the brake pipe to chamber 103 in the quick service valve device 9 and the build up of pressure in said chamber therefore will lead that in chamber 102 which is open to the supply reservoir 3, whereby spring 106 will hold the parts of the quick service valve device in the position in which they are shown in the drawing. With the quick service slide valve 107 thus positioned a cavity 182 therein will open chamber 86 between the cut-off valve diaphragms 78, 79 to atmosphere by way of a passage 183, said cavity and an atmospheric port 184.

With the brake cylinder 4 and brake cylinder passage 113 vented as above described, chamber 110 in the inshot valve device 10 will also be vented and permit spring 125 to hold the piston 116 in contact with seat 117 and the check valve 109 out of contact with its seat 111 whereby the brake cylinder passage 27 will be opened to passage 113 in by-passing relation to choke 114.

With the inshot valve piston 116 in its upper position, as just described, diaphragm chamber 91 in the control reservoir cut-off valve device 8 will be vented via passage 119, cavity 124 in the peripheral portion of said piston, chamber 120 below said piston and the vent port 121. Diaphragm 79 in the cut-off valve device 8 being thus subject on opposite sides to atmospheric pressure will permit spring 97 to hold the parts of the cut-off valve device 8 in their charging position in which they are shown in the drawing.

With the inshot valve piston 116 in its upper position, just described, spring 133 will open the valve 130 for venting chamber 131 and the connected passage 134 to atmosphere. With the graduated control portion 6 in normal position the passage 134 is open through a cavity 185 in the main slide valve 60 to a passage 186 leading to the seat of the quick service slide valve 107 where it is lapped in the normal position of said valve. The preliminary quick service reservoir 14 and thereby the secondary quick service reservoir 15 being connected to passage 186 will therefore both be normally vented via the normally vented passage 134.

Effecting application of brakes

When it is desired to effect an application of brakes, a reduction in pressure in the brake pipe 2 will be initiated by the engineer's brake valve device on the locomotive, in the well-known manner. When the brake pipe pressure is reduced as just mentioned check valve 169 in the graduated control portion 6 will prevent back-flow of fluid under pressure from the supply reservoir 3 and control reservoir 13 to the brake pipe although there will be momentarily a slight trickle back through the overcharge dissipating choke 166 which however is of no consequence during the operation under consideration. As a result, the pressure in the brake pipe 2 on the first car of a train will promptly reduce with that on the locomotive and when reduced, for example, four-tenths of a pound, such reduction in chamber 103 of the quick service valve device 9 relative to the pressure of fluid in the supply reservoir 3 acting in chamber 102 will create a sufficient differential in pressures on opposite sides of diaphragm 101 to deflect said diaphragm against spring 106 and move the slide valve 107 to a quick service position defined by contact between the right-hand end of stem 104 and the casing.

In quick service position of slide valve 107, passage 183 will be disconnected from atmospheric passage 184 and connected to a port 187 in said slide valve whereupon brake pipe pressure in chamber 106 will promptly equalize into chamber 86 in the cut-off valve device 8. The area of diaphragm 78 and plunger 81 thus subject to pressure of fluid in chamber 86 being greater than the opposing area subject to pressure in chamber 80 will create a differential in forces on said diaphragm acting in the direction of the left hand which together with the pressure of fluid in chamber 80 acting on diaphragm 77, or which latter pressure by itself, will snap the diaphragms 78, 77 and slide valve 95 against spring 97 to a left-hand cut-off position defined by contact between plate 83 and casing stop 99. In this cut-off position of slide valve 95 passages 167, 174 and 177 are all disconnected from valve chamber 80 and from each other whereby the fluid in said chamber and the connected control reservoir 13 and diaphragm chamber 32 will be promptly bottled up at a pressure, it will be noted, equal substantially to that in brake pipe 2 when fully charged.

Also in the quick service position of the quick service slide valve 107 the passage 186 will be opened directly to valve chamber 103 whereupon fluid under pressure from the brake pipe 2 will rapidly flow through said chamber and passage, cavity 185 in the main slide valve 60 of the graduated control portion 6 to passage 134 and thence to atmosphere past the open valve 130, through chamber 120 and passage 121 in the inshot valve device 10. It is to be noted that the quick service reservoirs 14, 15 are open to passage 186 but no material degree of pressure will be obtained therein while passage 186 is open to atmosphere, as just described, due to the fact that the portion of passage 186 connecting said reservoirs to atmosphere will have greater flow capacity than the portion between said reservoirs and the quick service valve device 9, which latter portion will consequently act as a choke or, if desired, a controlling choke (not shown) may be placed therein.

It will now be seen that in response to a very slight reduction in pressure in brake pipe 2 the quick service valve device 9 will operate to cause operation of the cut-off valve device 8 to bottle up the fluid under pressure in the control reservoir 13, to disconnect the supply reservoir 3 from the brake pipe 2 and to open said brake pipe to atmosphere for effecting a fast local venting of fluid under pressure from said brake pipe. The reduction in brake pipe pressure thus effected will hasten the reduction in pressure in the brake pipe on to the next operating brake equipped car of a train where the quick service valve device 9 will operate, as just described, to open a local vent from the brake pipe to hasten the slight reduction to the next operating brake equipped car of a train and thus serially, from one operating brake equipment to another through the train, the reduction will be transmitted even though at intervals in the train one or more non-brake equipped cars or cars with non-operating brake equipments may be bunched together.

It is further desired to note that since in Europe brake controlling valve devices do not have to distinguish between different service and emergency rates of reduction in brake pipe pressure, as in the United States, the quick service reduction in brake pipe pressure effected by operation of the quick service valve device 9 may be as rapid as desired which in conjunction with the very low differential in fluid pressures required to operate said quick service valve device permits any desired rate of serial operation of the quick service valve devices in a train.

When the pressure of fluid in the brake pipe is reduced by operation of the quick service valve device 9, as just described, a corresponding reduction in pressure will occur in chamber 21 of the graduated control portion 6, and when the pressure in said chamber thus becomes sufficiently reduced the bottled-up control reservoir pressure in chamber 32 will move the diaphragm pile downwardly against the reduced brake pipe pressure and pressure of spring 49 in chamber 21.

It is intended that the pile of diaphragms 17 to 20 move downwardly, as just described, when brake pipe pressure in chamber 21 is reduced for example two or three pounds below control reservoir pressure in chamber 32. However, if the diaphragm pile does not move downwardly upon such a reduction in brake pipe pressure then by operation of the quick service valve device 9 the pressure in the brake pipe 2 and chamber 21 will continue to be reduced relative to control reservoir pressure in chamber 32 until a sufficient differential between such opposing pressures on the diaphragm pile is obtained to ensure such movement. It will thus be evident that the positive local quick service venting of fluid under pressure from the brake pipe by operation of the quick service valve device 9 will ensure movement of the respective diaphragm pile on a brake equipped car even if located in a train to the rear of a bunch of two or more non-brake equipped car or cars provided with brake equipment which is not operating.

By incorporating the quick service function in the valve device 9 which only has the additional function of controlling pressure of fluid in chamber 86 of the control reservoir cut-off valve device 8 and which therefore permits use of a relatively small slide valve 107, variations in resistance to movement of which will be very small, the quick service valve device 9 may be designed to dependably operate on a very slight reduction in brake pipe pressure, such as above mentioned, to ensure transmission of a sufficient quick service reduction in brake pipe pressure through a train to cause prompt operation of all of the quick service valve devices 9 on the train, and such operation of said quick service valve device will positively ensure movement of the respective normally, relatively sluggish, multiple diaphragm graduated control portions 6 out of their brake release position, in which the graduated control portion 6 is shown in the drawing, to an application position which will be presently described.

When the diaphragm pile thus moves in response to a reduction in brake pipe pressure in chamber 21, the stem 57 and auxiliary slide valve 64 will move therewith relative to the main slide valve 60 until shoulder 63 on said stem engages the upper end of said main slide valve and during such movement communication will be closed between the brake cylinder passage 113 and release passage 143 and an application port 188 in the main slide valve will be uncovered and opened to valve chamber 30. Then when the differential in opposing pressures on the diaphragm pile is further increased sufficiently the main slide valve 60 will be moved to an application position in which the supply reservoir charging passage 172 will be lapped by said valve and passage 186 will be disconnected from passage 134 for stopping further quick service venting of fluid under pressure from brake pipe to atmosphere, but quick service venting of fluid under pressure from said brake pipe will continue at a fast rate into the preliminary quick service reservoir 14 and thence through the restricted port 16 into the secondary quick service reservoir 15 at a reduced rate, the purpose of the reduced rate being to terminate turbulence created in the pressure in the brake pipe by the preceding fast rates of quick service venting of fluid under pressure therefrom and to obtain a stabilized pressure therein for subsequent control of the graduated control portion 6.

The combined volumes of the two quick service reservoirs 14, 15 is such as to ensure a certain minimum reduction in pressure in the brake pipe, after movement of the graduated control portion 6 to cut off the quick service venting of fluid under pressure from the brake pipe at atmosphere, which is necessary to provide as quickly as possible a pressure in the brake cylinder device 4 (as will be later described) which will displace the brake cylinder piston (not shown) therein to its application position in which the usual brake shoes will be in contact with the car wheels. In Europe where approximately half or more of the cars in a train are not brake equipped but only provided with a brake pipe or which may be provided with brake equipment that is not operating and therefore cut out, the quick service reservoirs 14, 15 on the operating brake equipped cars through the train must together provide for reducing the pressure in the brake pipe on the other cars to ensure obtaining this minimum quick reduction throughout the train.

When in response to this quick service reduction in brake pipe pressure the diaphragm pile of the graduated control portion 6 is moved down by the pressure in the control reservoir 13 and chamber 32 as above described, the application port 188 will move into registry with passage 113 whereupon fluid under pressure will rapidly flow from valve chamber 30 and the supply reservoir 3 to said passage and thence through choke 114 to passage 27 and at the same time past the open valve 109 in the inshot valve device 10 to said passage and from said passage to the brake cylinder device 4, the open valve 109 permitting flow of fluid under pressure to the brake cylinder device substantially as rapid as supplied to passage 113. When the pressure in chamber 112 of the inshot valve device 10, and thereby in the brake cylinder device 4, is thus increased to a degree, such as seven pounds, said pressure acting on the area of the inshot valve piston within the seat 117 will overcome the opposing pressure of spring 125 and move said piston out of contact with said seat which will expose the full area of said piston to pressure of fluid in chamber 112. This will provide a force so in excess of the opposing force of spring 125 that the piston 116 will promptly snap to its lower position in which valve 122 seats against gasket 123. This movement of piston 116 will permit spring 115 to close the check valve 109 whereupon further supply of fluid under pressure to the brake cylinder device will be limited to the flow capacity of choke 114.

As fluid under pressure is supplied to the brake cylinder device 4, as just described, such pressure will also become effective in diaphragm chamber 26 where it acts in opposite directions on the differential areas of diaphragms 17 and 18 and produces a force which acts with brake pipe pressure and pressure of spring 49 in chamber 21 in opposition to control reservoir pressure in chamber 32. Assuming that the reduction in brake pipe pressure effected by operation of the engineer's brake valve is limited to some chosen degree, then when the pressure obtained in the brake cylinder device 4 and in chamber 26 is increased to a chosen relation to the degree of brake pipe reduction in chamber 21, the brake cylinder pressure acting in chamber 26 will move the pile of diaphragms and the auxiliary slide valve 64 upwardly to an application lap position in which said slide valve will lap the application port 188 to prevent further supply of fluid under pressure to said chamber and the brake cylinder device thereby limiting the pressure in said brake cylinder device in accordance with the degree of reduction in brake pipe pressure. The application lap position of the auxiliary slide valve 64 is defined by engagement of shoulder 62 on stem 57 with the lower end of the main slide valve 60 which with the supply of fluid under pressure to chamber 26 cut off will stop upward movement of the diaphragm pile.

If the engineer desires to increase the degree of brake application he will effect a further reduction in pressure in brake pipe 2 according to the desired increase in brake application. Upon the consequent reduction in pressure in chamber 21 the diaphragm pile will move down to actuate the auxiliary slide valve 64 to open the port 188 whereupon fluid will again be supplied to the brake cylinder device 4 and chamber 26, and when the pressure in said brake cylinder device and chamber becomes thus increased in proportion to the degree of reduction in brake pipe pressure the diaphragm pile will again move the auxiliary slide valve to application lap position to cut off further supply of fluid under pressure to the brake cylinder device and chamber 26. By thus reducing the brake pipe pressure in such steps as desired, proportional increases in pressure may be provided in the brake cylinder device 4 to provide any selected degree of braking, or if desired, the brake pipe reduction may be made in a single stage resulting in a corresponding build-up in degree of brake application. Normally the pressure of fluid in the supply reservoir 3 will exceed that in the brake cylinder device 4 when what may be considered a full application of brakes is effected, but if what may be called an over-reduction in brake pipe pressure is effected or the brake pipe pressure is completely released to atmosphere, the pressure of fluid in the supply reservoir 3 will equalize into the brake cylinder device 4 and chamber 26 without producing sufficient force on diaphragm 18 to move the diaphragm pile and auxiliary slide valve 64 out of a position in which the application port 188 will remain open to chamber 30 and the supply reservoir 3. Under such a condition the follower plate 43 will contact gasket 50 and seal the end of port 51 which will cooperate with check valve 169 to prevent leakage of fluid under pressure from the brake equipment back to the brake pipe.

From the above description it will be clear that an application of brakes may be graduated on in any desired steps or may be made in a continuous step if desired. It will also be noted that closing the valve 109 in the inshot valve device will reduce the rate of brake application to the flow capacity of choke 114. The valve 109 closes at a pressure in the brake cylinder device 4 which is just sufficien to displace the brake cylinder piston to its application position but not sufficient to produce effective braking, in order to prevent damaging running in of slack in a train. Due to its use the inshot valve device 10 therefore provides for prompt displacement of the brake cylinder piston so as not to materially lengthen the time required to obtain an effective application of brakes. The choke 114 then governs the rate of effective brake application and will provide a sufficiently uniform rate of brake application through a train to decelerate it or bring it to a stop without objectionable shock.

While an application of brakes of a degree proportional to the degree of brake pipe reduction is in effect with the graduated control portion 6 in application lap position, if there should be leakage of fluid under pressure from the brake cylinder device 4, the resulting reduction in pressure therein will create a like reduction in pressure in diaphragm chamber 26 and thereby in the force opposing control reservoir pressure in chamber 32 and when such reduction becomes sufficient the latter pressure will gradually move the diaphragm pile downward. The auxiliary slide valve 64 moving with the diaphragm pile will finally start to open the service port 188 and permit fluid under pressure to flow from the supply reservoir 3 to the brake cylinder device 4 and diaphragm chamber 26. The service port 188 will thus be gradually opened until the rate of supply of fluid under pressure to the brake cylinder device and diaphragm chamber 26 becomes sufficient to offset the leakage of fluid under pressure therefrom and prevent further reduction in pressure in diaphragm chamber 26, whereupon movement of the diaphragm pile will cease in a position where the pressure of fluid in the brake cylinder device will be maintained against further drop.

If a brake application is in effect for a sufficient period of time and leakage from the brake cylinder device 4 is such that the pressure of fluid in the supply reservoir 3 becomes reduced to that in the brake cylinder device which would prevent further maintenance from the supply reservoir 3, but, if further maintenance is desired, a communication including a choke 189 connecting the passage 170 to the supply reservoir passage 31 may be provided through which fluid pressure in the brake cylinder device 4 may be maintained from the brake pipe 2 by flow from diaphragm chamber 21 through port 51, passage 168, past check valve 169, through passage 170, choke 189 to the supply reservoir passage 31 and thence to the brake cylinder device 4. The flow capacity of choke 189 will be limited according to a chosen permissible leakage from the brake cylinder device and therefore be so small as not to create a bleed from the brake pipe, in case of greater brake cylinder leakage, which would prevent prompt response of the respective brake controlling valve device and brake controlling valve devices on other cars of a train to a change in brake pipe pressure initiated by the engineer. It will be noted that the choke 189 is in parallel with the normal charging choke 171 and therefore will be effective with the latter for charging the supply reservoir 3 initially as above described, as well as after an application of brakes, as will be subsequently described, but such effect will be substantially negligible due to the relatively small flow capacity of said choke 189. If maintenance of brake cylinder pressure from the brake pipe, as just described, is not desired, then the choke 189 may be replaced by a plug (not shown).

Except in case of depletion due to maintaining brake cylinder pressure against leakage the pressure of fluid in the supply reservoir 3 and thereby in diaphragm chamber 102 of the quick service valve device 9 will always exceed that in the brake pipe 2 present in diaphragm chamber 103 by a degree sufficient to hold the parts of said device in their right-hand or quick service position while a brake application is in effect. In case of depletion in supply reservoir pressure down to that in the brake pipe 2, spring 106 will however return the parts of the quick service valve device 9 to their normal position in which they are shown in the drawing. After charging of the quick service reservoirs 14, 15 with fluid under pressure from the brake pipe and operation of the inshot valve device 10 to its lower position, the position of the parts of the quick service valve device 9 is not material however since, as will now be described, it has no effect upon position of the control reservoir cut-off valve device 8 which it is desired to remain in its left-hand position as long as an application of brakes is in effect.

When the inshot valve device 10 moves to its lower position it closes communication between passage 119 and atmosphere and opens said passage past the seat 117 to a source of fluid under pressure such as present in the brake cylinder passage 27 whereby fluid under pressure from said passage becomes effective in chamber 91 on the cut-off valve diaphragm 79. Thus if fluid under pressure is vented from chamber 86 by return of the quick service valve device 9 to normal position while an application of brakes is in effect, pressure of fluid in chamber 91 on diaphragm 79 will hold the parts of the control reservoir cut-off valve device in their left-hand position and continue to do so until subsequently a substantial complete release of brakes has been effected, as will be described hereinafter.

When the parts of the inshot valve device 10 move to their lower position in effecting an application of brakes, as above described, the valve 130 is also seated to close communication between passage 134 and atmosphere and said valve is thus maintained closed until subsequently the brake application is substantially fully released as will be explained later.

*Release of brake application*

In order to effect release of a brake application and to recharge the brake equipment with fluid under pressure, fluid under pressure will be supplied to the brake pipe 2 and thence to check valve chamber 47. With the check valve 25 open fluid under pressure will flow from chamber 47 past said check valve to chamber 21, but in case the follower plate 43 is in sealing contact with gasket 50 as in case of an overreduction in brake pipe pressure, fluid under pressure from said chamber 47 will flow past said check valve to the portion of chamber 21 within such seal and through choke 22 to the portion of chamber 21 encircling said seal thereby subjecting the whole lower face of said diaphragm to pressure of fluid from the brake pipe.

When the pressure of fluid in chamber 21 is thus increased sufficiently it, acting in conjunction with spring 49, and brake cylinder pressure in chamber 26 acting on diaphragm 18, will create a force on the diaphragm pile which exceeds the opposing force created by brake cylinder pressure in said chamber 26 acting on diaphragm 17 plus control reservoir pressure in chamber 32 acting on diaphragm 20 and will move the diaphragm pile upwardly. If the diaphragm pile happened to be in application position the initial movement thereof will shift the auxiliary slide valve to application lap position, otherwise all movement will start from said lap position as soon as a sufficient differential in opposing forces is obtained to move the main slide valve 60, and such movement will then continue until the stem 57 and slide valve 60 contact plunger 66 where the supply reservoir charging passage 172 is opened to permit flow of fluid under pressure from diaphragm chamber 21 to the supply reservoir via the normal charging choke 171 as before described. The supply reservoir charging communication via the fast charging choke 173 and overcharge dissipating choke 166 is closed at this time by the control reservoir cut-off slide valve 95 being held in its left-hand position by pressure of fluid either in chamber 86 or chamber 91, as before described. Fluid under pressure will also flow from diaphragm chamber 21 to the supply reservoir 3 through the maintaining choke 189, if such be employed, but such flow will be so slight as not to have any material effect upon recharging of said reservoir.

As before described in connection with initial charging of the brake equipment the pressure of fluid in the brake pipe 2 will be increased more rapidly on cars adjacent the locomotive than on cars further back in a train. Consequently if a car is close to the locomotive and the pressure of fluid in chamber 21 becomes increased sufficiently against the drain therefrom to the supply reservoir 3 to create an upwardly acting force which will overcome the force of spring 68, the pile of diaphragms will be moved upwardly to permit such closing of valve 25 and consequent restricting of flow of fluid under pressure to chamber 21 as to balance the rate of increase therein against the force of spring 68 thereby restricting the recharge of the supply reservoir 3 by the valve 25. Even when overcharge of the brake pipe at the locomotive is terminated, if the pressure obtained in chamber 21 against the drain therefrom to the supply reservoir 3 provides a force which can overcome the spring 68 the diaphragm pile will move to permit such closing of check valve 25 as necessary to limit the rate of increase in pressure in chamber 21 according to the relatively slow rate at which the supply reservoir pressure can be restored via choke 171.

The effect of closing to a greater or less degree of the check valve 25 plus the normal or slow charging choke 171 plus the negligible effect of the maintaining choke 189 in restoring the pressure of fluid in the supply reservoir 3 is therefore, at the head of a train, such as to limit the drawing off of fluid under pressure from the brake pipe so as to hasten flow of fluid under pressure to the rear of a train for causing operation of the brake controlling valve devices at the rear of the train to their brake releasing position for also recharging the supply reservoir 3 there.

When the graduated control portion 6 is returned to its release position, in which it is shown in the drawing, as well as to any position against spring 68, communication will be restored between passages 113 and 143 whereby fluid under pressure will be released from the brake cylinder device 4 via choke 114, passage 113, cavity 180 in the auxiliary slide valve 64, passage 143 and the release choke 146 which controls the rate of such release on account of being of less flow capacity than choke 114.

As fluid under pressure is thus released from the brake cylinder device 4 the pressure of fluid in chamber 26 will reduce correspondingly and in case the restoration of brake pipe pressure in chamber 21 is limited to some chosen degree, brake cylinder pressure will continue to reduce until its effect in chamber 26 on diaphragms 18, 17 is so reduced with respect to the increase in brake pipe pressure in chamber 21 that control reservoir pressure in chamber 32 acting on diaphragm 20 will move the diaphragm pile and auxiliary slide valve 64 downwardly relative to the main slide valve 60 to a release lap position defined by contact of shoulder 63 on stem 57 with the main slide valve 60. In the release lap position of the auxiliary slide valve 64 communication will be closed between the brake cylinder device 4 and release passage 143 to thereby limit the reduction in pressure in said brake cylinder device in accordance with the increase in pressure in the brake pipe 2.

In the manner just described, the pressure of fluid in the brake cylinder device 4 may be graduated off in such steps as desired by proper step increases in pressure in the brake pipe 2, or in case the increase in pressure in brake pipe 2 is continuous, a corresponding continuous venting of fluid under pressure from the brake cylinder device will occur. When the pressure in the brake pipe 2 and thereby in diaphragm chamber 21 finally becomes increased to within two or three pounds of the normal pressure carried in the brake pipe, and which pressure is effective in the control reservoir 13 and acting in chamber 32 on diaphragm 20, the spring 49 will hold the diaphragm pile in its release position as the pressure in the brake cylinder device 4 and diaphragm chamber 26 finally reduces to atmospheric pressure and a complete recharging of the supply reservoir 3 to the pressure in the brake pipe will occur.

When the pressure of fluid in the brake cylinder device 4 becomes reduced to a substantially ineffective degree, such as five pounds, the pressure of spring 125 in the inshot valve device 10 will move piston 116 of the contact with gasket 123 and back into contact with seat 117 which opens passage 119 to atmosphere via chamber 120 and at the same time permits opening of valve 130 by spring 133.

When the graduated control portion 6 is returned to its release position in response to an increase in pressure in brake pipe 2, as above described, communication will be restored between passages 134, 186 by way of cavity 185 in the main slide valve 60, but fluid under pressure will not be released from the quick service reservoirs 14, 15 via such communication until valve 130 is opened in the inshot valve device 10. This holding of fluid under pressure in the quick service reservoirs 14, 15 until opening of valve 130, which does not occur until a brake application is substantially fully released, will therefore prevent undesirably initiating a quick service reduction in brake pipe pressure and obtaining a consequent quick shock producing increase in brake application, if while releasing, the operator desires to reapply the brakes to a greater degree and therefore reduces brake pipe pressure and causes operation of the quick service valve device 9 to its quick service position. The quick service reservoirs 14, 15 being still charged with fluid under pressure, quick service venting of fluid under pressure from the brake pipe will not therefore occur.

If while effecting a release of brakes, as above described, the check valve 25 is closed, as it may be momentarily on cars adjacent the locomotive, and the engineer desires to increase the degree of brake application and reduces brake pipe pressure accordingly, the check valve 24 will permit prompt flow of fluid under pressure from chamber 21 to the brake pipe and thereby prompt brake applying response of the diaphragm pile which otherwise might be delayed until brake pipe pressure in chamber 47 were reduced sufficient for pressure of fluid in chamber 21 to unseat check valve 25 against spring 48.

When passage 119 is opened to atmosphere upon return of the inshot valve piston 116 to its upper position upon substantial full release of a brake application fluid under pressure will be released from diaphragm chamber 91 in the control reservoir cut-off valve device 8. With chamber 86 vented spring 97 will then return the control reservoir cut-off valve device 8 to normal position to reestablish communication through the fast charging choke 173 and overcharge dissipating choke 166 and between the brake pipe 2, supply reservoir 3 and control reservoir 13 to permit prompt equalization between the pressures therein and particularly in the control reservoir 13 and diaphragm chamber 32 for controlling operation of the diaphragm pile during a subsequent application and release of brakes.

It will now be seen that while both the normal charging choke 171 and fast charging choke 173, as well as the negligible effect of the overcharge dissipating choke 166 and maintaining choke 189 control and provide for a rapid rate of charging of the brake equipment initially in order to expedite movement of a train, the fast charging choke 173 and overcharge dissipating choke are cut out by the control reservoir cut-off valve device 8 during recharging while effecting a substantial complete release of brakes, so that such recharging will be limited to substantially the flow capacity of the normal charging choke 171 in order to provide a substantial uniform recharging of all brake equipments through a train and thereby a uniform release of brakes on all braked cars in the train. In order to thus insure control of graduated release of brakes until a brake application is substantially fully released, the control reservoir cut-off valve device 8 is maintained in its position for bottling up the fluid under pressure in the control reservoir 13 and diaphragm chamber 32 until return of the inshot valve device 10 to normal position which does not occur until after a substantial complete release of brakes is obtained.

As will be readily apparent from previous description, if a car provided with this brake equipment is to be operated in passenger service the service selector valve device 11 will be turned to passenger position in which the communication including choke 141 will be opened so that after operation of the inshot valve device in response to a chosen pressure in the brake cylinder device 4, fluid under pressure will be supplied to the brake cylinder device at a rate equal to the combined flow capacities of choke 114 and 141 to provide the desired faster rate of brake application for this service than permitted in freight service where choke 114 alone is effective. In case the car is to be operated in express service the service selector valve device 11 will be turned to express position where the communication including choke 142 will be connected in parallel with that containing choke 114 to provide the desired rate of brake application for this type of service. In both passenger and express positions of the service selector valve device 11, passages 143 and 144 will be connected establishing the communication including choke 145 in parallel with the freight brake release communication including choke 146, in order to provide for the more rapid rate of brake release in these types of service than desired in freight service where choke 146 alone is effective. The combined brake releasing capacities of chokes 145 and 146 may exceed that of the freight application choke 114 and in order to be effective to control the rate of brake release in passenger and express service, the check valve 109 in the inshot valve device 10 will be blown from its seat by brake cylinder pressure in bore 112 upon release of fluid under pressure from chamber 110 to open the communication by-passing the choke 114.

Regardless of the position of the service selector valve device 11, the operation of the brake equipment otherwise in response to a reduction and an increase in brake pipe 2 is the same as above described.

*Connecting a car with an overcharged brake equipment to a train on which the brake equipments are charged*

When a train is moved on to a siding or the like to pick up one or more cars and the brake pipe is connected between the train and such car or cars, it may be desired that the brake equipment on the uncharged car or cars charge as rapidly as possible to expedite the train getting under way. If the equipment above described is on the car or cars being coupled to a train and is void or only partially charged with fluid under pressure, it will be seen that the sudden rush of fluid under pressure from the already charged brake pipe 2 on the train to the uncharged brake pipe on the car or cars being picked up would result in such closing of check valve 25 as to limit the rate of charging of the equipment on said car or cars to a slow rate as in initially charging a car close to a locomotive. It will therefore be seen that movement of the train would be delayed.

If this be considered objectionable it may however be overcome by the provision of a passageway 190 connecting the brake pipe passage 23 to passage 174, this communication by-passing the check valve 25 and therefore providing for a maximum rate of charging of the control reservoir 13 and supply reservoir 3 even with said check valve closed. In the drawing this communication through passageway 190 is shown closed by a removable plug 191 which would have to be removed if it were desired to obtain the fast charging of a car or cars picked up from a siding. A check valve 192 in passage 190 is provided to prevent reverse flow of fluid under pressure from the supply reservoir 3 and control reservoir 13 to the brake pipe 2 to avoid interference with initiating an application of brakes and operation of the quick service valve device 9.

If the plug 191 were removed it will be apparent that the substantial uniform initial charging of a train, as hereinbefore described, would not be obtained since the check valve 25 is by-passed, but initial overcharging of the brake equipment, if next to a locomotive, could be avoided by use of a spring 193 to urge the check valve 192 to its seat when the pressure of fluid in the supply and control reservoirs become increased to some chosen degree less than normal, whereupon the check valve 25 would function, as before described, to control all further charging. The passage 174 being lapped by the slide valve 95 in the control reservoir cut-off valve device 8 while an application of brakes is in effect, the communication 190 would have no effect upon operation of the equipment in effecting a release of brakes, as will be apparent.

As before described, spring 68 is of such pressure as to so regulate opening of check valve 25 as to normally prevent overcharging of brake equipments adjacent a locomotive while the engineer's brake valve device is in running position. It may be found that by properly limiting the length of time which the brake valve device is allowed to remain in release position that the pressure of spring 68 may be increased slightly which would result in a greater opening of check valve 25 for any chosen differential between control reservoir pressure in chamber 32 and opposing pressure in chamber 21, and consequently, a faster rate of charging of the control reservoir 13 and supply reservoir 3 which would be acceptable in picking up an uncharged car or cars from a siding. If such a modification of spring 68 be found to be satisfactory then the passage 190, check valve 192, spring 193 and plug 191 would be dispensed with.

Operation of release valve device 12

If a trainman desires to release an application of brakes locally on a car, he will operate lever 162 of the combined brake cylinder and supply reservoir release valve device 12 to unseat the check valve 150 whereupon such release will occur. The graduated control portion 6 will of course be in application lap position at the time of initiating such release and due to the consequent reduction in brake cylinder pressure in diaphragm chamber 26 will move to application position to supply fluid under pressure from the supply reservoir 3 to the brake cylinder device 4 to compensate for the venting of fluid under pressure from said brake cylinder device. By holding the check valve 150 open complete release of fluid under pressure from the brake cylinder device 4 and supply reservoir 3 may therefore be eventually obtained. If the trainman desires to obtain a faster release of fluid under pressure from the brake cylinder device 4 and supply reservoir 3 he may however operate lever 162 to also open the check valve 151 whereupon fluid under pressure will be vented from the supply reservoir 3 past said check valve and then along with the fluid under pressure from the brake cylinder 4 past the check valve 150 to atmosphere. It will be seen that the pressure in the supply reservoir 3 acting in chamber 30 of the graduated portion 6 cannot therefore be vented without venting fluid under pressure from the brake cylinder device 4 nor can the supply reservoir pressure be reduced faster than brake cylinder pressure which is acting on the seated face of the main slide valve 60 and auxiliary slide valve 64, whereby the pressure of fluid in the brake cylinder device will be prevented from ever blowing said slide valves from their seat which unseating might permit foreign matter to get between said valves and their seats and result in failure of the graduated control portion to operate as desired. By thus ensuring that brake cylinder pressure acting under the slide valves 60, 64 will be reduced at least as fast as supply reservoir pressure in valve chamber 30 is reduced, there is no need for mechanical means in chamber 30 to press the main slide valve 60 to its seat and which would undesirably reduce sensitivity of the diaphragm pile to fluctuations in controlling fluid pressure.

If it be desired to also vent fluid under pressure from the control reservoir 13 and diaphragm chamber 32, or to completely release fluid under pressure from the brake equipment, such may be effected by holding lever 162 in the position for releasing fluid under pressure from the brake cylinder device 4 and supply reservoir 3 until the inshot valve device 10 operates to permit opening of valve 122. Upon opening of check valve 122 the parts of the control reservoir cut-off valve device 8 will return to normal position opening the control reservoir 13 to the supply reservoir 3 whereupon the fluid under pressure from said control reservoir will be released along with that from the supply reservoir 3.

Figure 3:
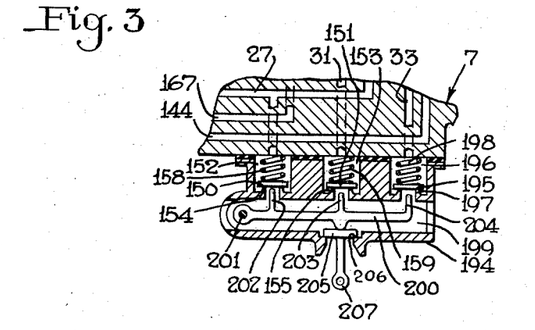
Figs. 3 and 4 are diagrammatic views of modifications of the invention.

Description of Fig. 3

In order to release fluid under pressure from the control reservoir 13 and diaphragm chamber 32 by operation of the release valve device 12, as just mentioned, it will be noted that the fluid under pressure in the brake cylinder device 4, and due to consequent operation of the graduated control portion 6, the fluid under pressure in the supply reservoir must be substantially fully dissipated to cause operation of the inshot valve device 10 and thereby of the control reservoir cut-off valve device 8 to open the control reservoir 13 to the supply reservoir 3. For effecting complete release of fluid under pressure from the brake equipment this is satisfactory.

However, let it be assumed that the control reservoir 13 and diaphragm chamber 32 would become so overcharged from an overcharged brake pipe 2 that upon subsequent reducing of brake pipe pressure to normal, the diaphragm pile would move against spring 49 and cause an application of brakes. If the engineer's brake valve device were allowed to remain in release position too long before moving it to running position this might occur on the first car or two next to the locomotive. It would be undesirable under such a condition to have to substantially completely dissipate the fluid under pressure from the brake cylinder device 4 and supply reservoir 13 in order to obtain operation of the control reservoir cut-off valve device 8 to open the control reservoir 13 to the supply reservoir 3 to relieve the excess pressure in said control reservoir and diaphragm chamber 32, so if it be desired to avoid this possible difficulty, a release valve device 194 shown in Fig. 3 of the drawing may be employed instead of the release valve device 12.

The release valve device 194 comprises check valves 150, 151 contained in chambers 152, 153 open to the brake cylinder passage 27 and supply reservoir passage 31 and urged into contact with seats 154, 155 by springs 158, 159, respectively, like the release valve device 12. There is, however, also provided another check valve 195 contained in a chamber 196 and urged into contact with a seat 197 by a spring 198, the chamber 196 being open to an extension of passage 33 leading to the control reservoir 13 and diaphragm chamber 32. With the check valves 150, 151 and 195 seated fluid under pressure will be held against dissipation past said check valves to an atmospheric chamber 199, but upon unseating of any one or more of said check valves fluid under pressure will be vented from the respective passage or passages.

The release valve device 194 further comprises a lever 200 extending underneath the check valves 150, 151, and 195 and pivoted at one end on a pin 201. The lever 200 has three fingers 202, 203 and 204 projecting from one side for engagement with the seating faces of check valves 150, 151 and 195, respectively, whereby upon turning of said lever in a counterclockwise direction said check valves will be unseated, the finger 202 being of such length that upon a certain turning movement of lever 200 the check valve 150 will be unseated without unseating of check valves 151 and 195, but upon further turning of said lever the check valves 151 and 195 will also be unseated.

A disc 205 supported around its edge on a shoulder 206 in the casing is engaged on one side by the lever 200 while projecting from its opposite side is a lever 207 adapted to be connected by a rod (not shown) to the side of the car. By pulling or pushing on the rod the lever 207 may be operated to rock the disc 205 on the casing shoulder 206 for thereby rocking the lever 200 to open the check valve 150 or along with it the check valves 151 and 195.

The release valve device 194 therefore provides for selective releasing of fluid under pressure from the brake cylinder device 4 alone or also from the supply reservoir 3 and control reservoir 13, whereby, if desired, complete release of fluid under pressure from a brake equipment may be obtained. If all of the check valves are unseated it will be noted that the pressure of fluid in the control reservoir 13 and diaphragm chamber 32 will promptly reduce, so that in case of a stuck brake such as above described, it will only be necessary to reduce such pressure sufficient to dissipate the overcharge and allow the check valves to seat, whereupon the graduated control portion 6 will operate to cause a release of brakes and the pressure in the supply reservoir 3 and control reservoir 13 will merely build up to the normal brake pipe pressure.

By insuring adequate venting capacity of the check valve 150 it is possible to reduce brake cylinder pressure below the slide valves 60, 64 at least as fast as supply reservoir pressure will be reduced in chamber 30 to avoid blowing said slide valves from their seats, and by venting supply reservoir pressure acting on the seated face of slide valve 95 in the control reservoir cut-off valve device 8 when control reservoir pressure is being reduced to release a stuck brake, the possibility of slide valve 95 being blown from its seat will be minimized under such a condition.

Figure 4:
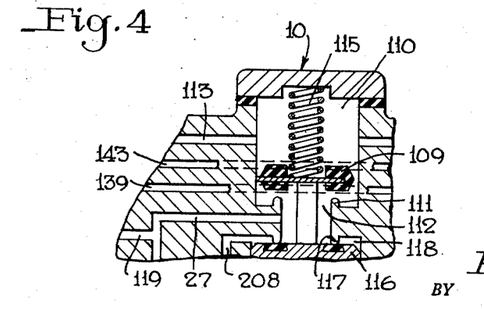

*Description of Fig. 4*

In the structure shown in Fig. 1A, it will be noted that the cut-off valve device 8 is held in its left-hand cut-off position until the inshot valve device 10 moves from its lower position back to its normal position upon substantial complete release of fluid under pressure from the brake cylinder device. If desired, this same result may be obtained by disconnecting passage 119 from chamber 118 in the inshot valve device 10 and connecting it directly to the brake cylinder passage 27; chamber 118 being still open, however, to chamber 120 with the inshot valve piston 116 seated against seat 117 via a passage 208. With this arrangement when an application of brakes is in effect fluid at brake cylinder pressure will be effective in chamber 91 to hold the cut-off valve device in its cut-off position until such pressure is reduced in effecting a release of brakes to a desired low value at which time spring 97 will return the cut-off valve device 8 to normal position.

SUMMARY

It will now be seen that I have provided a brake controlling valve device of the graduated release type which will provide a very fast rate of initial charging of a train. which will also provide for as uniform as possible application of brakes throughout a train with a minimum time elapse between the start of application at the front and rear of the train and also a minimum time elapse on each car between the initiation of the reduction in brake pipe pressure and obtaining effective braking; which will also provide for maintenance of brake cylinder pressure, against normal leakage, from the supply reservoir 3 and, if desired, from the brake pipe 2 after equalization of pressures in the supply reservoir and brake cylinder device, and which also provides for substantially uniform recharging of brake equipments and release of brakes throughout a train. Moreover the brake equipment is particularly adapted for use in trains where a number of cars may not be brake equipped or equipped with brakes which are cut-out, the equipment ensuring obtaining the above results even in such trains.

Having now described my invention, what I claim as new and desire to secure by Letters Patent, is:

1. In a fluid pressure brake apparatus, in combination, a brake pipe, a quick service reservoir, a brake controlling valve device controlled by pressure of fluid in said brake pipe and an opposing pressure and operative by said opposing pressure upon a chosen reduction in brake pipe pressure relative to said opposing pressure from a brake release position to a brake application position and comprising means for opening a fluid pressure release communication from said reservoir in said release position and for closing said communication in said application position, and a quick service valve device controlled by brake pipe pressure and an opposing pressure and operative upon less than said chosen reduction in brake pipe pressure to establish communication from said brake pipe to said quick service reservoir.

2. In a fluid pressure brake apparatus, in combination, a brake pipe, a quick service reservoir, a brake controlling valve device controlled by pressure of fluid in said brake pipe and an opposing pressure and operative by said opposing pressure upon a chosen reduction in brake pipe pressure relative to said opposing pressure from a brake release position to a brake application position and comprising means for opening a fluid pressure release communication from said reservoir in said release position and for closing said communication in said application position, a second communication of less flow capacity than said release communication and open to said quick service reservoir, and a quick service valve device controlled by brake pipe pressure and an opposing pressure and operative upon less than said chosen reduction in brake pipe pressure to open said second communication to said brake pipe.

3. In a fluid pressure brake apparatus, in combination, a brake pipe, a quick service reservoir, a brake controlling valve device controlled by pressure of fluid in said brake pipe and an opposing pressure and operative by said opposing pressure upon a chosen reduction in brake pipe pressure relative to said opposing pressure from a brake release position to a brake application position and comprising means for opening a fluid pressure release communication from said reservoir in said release position and for closing said communication in said application position, a second communication of less flow capacity than said release communication and open to said quick service reservoir, a second quick service reservoir, a passageway of less flow capacity than said release communication connecting said second quick service reservoir to the first named quick service reservoir, and a quick service valve device controlled by brake pipe pressure and an opposing pressure and operative upon less than said chosen reduction in brake pipe pressure to open said second communication to said brake pipe.

4. In a fluid pressure brake apparatus, in combination, a brake pipe, a brake cylinder device, a communication for conveying fluid under pressure to and from said brake cylinder device, valve means controlled by pressure of fluid in said brake pipe and an opposing pressure operative upon a reduction in brake pipe pressure relative to said opposing pressure to establish a communication for effecting quick service venting of fluid under pressure from said brake pipe, and an inshot valve device controlling both of said communications controlled by pressure of fluid in said brake cylinder device and operative when such pressure is less than a chosen degree to open said communications and operative when brake cylinder pressure is in excess of a chosen degree to close said communications.

5. In a fluid pressure brake apparatus, in combination, a brake pipe, a brake cylinder device, a communication for conveying fluid under pressure to and from said brake cylinder device, valve means controlled by pressure of fluid in said brake pipe and an opposing pressure operative upon a reduction in brake pipe pressure relative to said opposing pressure to establish a communication for effecting quick service venting of fluid under pressure from said brake pipe, an inshot valve device controlling both of said communications controlled by pressure of fluid in said brake cylinder device and operative when such pressure is less than a chosen degree to open said communications and operative when brake cylinder pressure is in excess of a chosen degree to close said communications, and a quick service reservoir open to the first named communication between said valve means and inshot valve device.

6. In a fluid pressure brake apparatus, in combination, a brake pipe, a brake cylinder device, a brake controlling valve device controlled by pressure of fluid in said brake pipe and an opposing pressure and operative upon a chosen reduction in brake pipe pressure relative to said opposing pressure to supply fluid under pressure to said brake cylinder device and upon an increase in brake pipe pressure relative to said opposing pressure to release fluid under pressure from said brake cylinder device, an inshot valve device controlling a communication thru which fluid under pressure is supplied by said brake controlling valve device to said brake cylinder device and operative by fluid at an exceeding a chosen pressure in said brake cylinder device to close said communication and in response to a lesser pressure in said brake cylinder device to open said communication, a constantly open relatively restricted communication connecting said brake controlling valve device to said brake cylinder device in by-passing relation to said inshot valve device, a quick service valve device controlled by brake pipe pressure and an opposing pressure and operative in response to less than said chosen reduction in brake pipe pressure to establish a communication through which a quick service reduction in pressure in said brake pipe is adapted to be effected, and means controlling the communication through which said quick service reduction in brake pipe pressure is adapted to be effected controlled by said inshot valve device for opening the last named communication when the pressure in said brake cylinder device is of said lesser degree and to close the last named communication when the pressure in said brake cylinder device is at or above said chosen pressure.

7. In a fluid pressure brake apparatus, in combination, a brake pipe, a brake cylinder device, a brake controlling valve device controlled by pressure of fluid in said brake pipe and an opposing pressure and operative upon substantial equalization of such pressures to a brake release position for opening said brake cylinder device to atmosphere and upon a chosen reduction in brake pipe pressure relative to said opposing pressure to a brake application position for supplying fluid under pressure to said brake cylinder device, an inshot valve controlling one communication through which said brake controlling valve device supplies fluid to said brake cylinder device and operative by fluid at and exceeding a chosen pressure in said brake cylinder device to close said communication and in response to a lesser pressure in said brake cylinder device to open said communication, a constantly open communication of less flow capacity than the first named communication by-passing said inshot valve device, a quick service valve device controlled by brake pipe pressure and an opposing pressure and operative in response to less than said chosen reduction in brake pipe pressure to open said brake pipe to a communication through which a quick service venting of fluid under pressure from said brake pipe to atmosphere is adapted to occur, said brake controlling valve device comprising means for opening the last named communication in its brake release position and for closing it in its brake application position, and means associated with said inshot valve device for closing the last named communication upon operation thereof by fluid at and exceeding the chosen pressure and for opening the last named communication upon operation in response to said lesser pressure.

8. In a fluid pressure brake apparatus, in combination, a brake pipe, a brake cylinder device, a fluid pressure supply reservoir normally charged with fluid at the pressure in said brake pipe, a brake controlling valve device operative upon a chosen reduction in pressure in said brake pipe from a release position for venting said brake cylinder device to an application position for supplying fluid under pressure from said supply reservoir to said brake cylinder device, a quick service valve device controlled by opposing pressures of fluid in said brake pipe and supply reservoir operation upon less than said chosen reduction in brake pipe pressure relative to the pressure of fluid in said supply reservoir to establish a communication through which quick service venting of fluid under pressure from said brake pipe is adapted to occur, said brake controlling valve device opening said communication in said release position and closing it in said application position, an inshot valve device controlling communication through which fluid under pressure is supplied to said brake cylinder device by said brake controlling valve device and also the quick service venting communication and operative to open both of such communications when brake cylinder pressure is less than a chosen degree and to close same in response to pressure in said cylinder device exceeding said chosen degree.

9. An apparatus for controlling brakes on a vehicle comprising, in combination, a brake pipe, a control reservoir, a brake controlling valve device arranged for control by opposing pressures of fluid in said brake pipe and reservoir for controlling application and release of said brakes, valve means responsive to release of fluid under pressure from a chamber to establish a communication between said brake pipe and reservoir for charging said reservoir with fluid under pressure from said brake pipe and operative by fluid under pressure in said chamber to close said communication, and valve means responsive to a reduction in pressure in said brake pipe to supply fluid under pressure to said chamber and responsive to restoration of pressure in said brake pipe to vent said chamber.

10. An apparatus for controlling brakes on a vehicle comprising, in combination, a brake pipe, a control reservoir, a brake controlling valve device arranged for control by opposing pressure of fluid in said brake pipe and reservoir for controlling application and release of said brakes, valve means responsive to release of fluid under pressure from a chamber to establish a communication between said brake pipe and reservoir for charging said reservoir with fluid under pressure from said brake pipe and operative by fluid under pressure in said chamber to close said communication, and quick service valve means responsive to a reduction in pressure in said brake pipe to establish a fluid pressure vent from said brake pipe for effecting a quick service reduction in brake pipe pressure and for at the same time supplying fluid under pressure to said chamber and operative upon restoration of pressure of fluid in said brake pipe to close said vent and release fluid under pressure from said chamber.

11. An apparatus for controlling brakes on a vehicle comprising, in combination, a brake pipe, a control reservoir, a brake controlling valve device arranged for control by opposing pressures of fluid in said brake pipe and reservoir for controlling application and release of said brakes, valve means responsive to release of fluid under pressure from a chamber to establish a communication between said brake pipe and reservoir for charging said reservoir with fluid under pressure from said brake pipe and operative by fluid under pressure in said chamber to close said communication, a quick service venting communication, a slide valve disposed in a valve chamber open at all times to said brake pipe and having one position for opening said valve chamber to said venting communication and to the first named chamber and having a second position for closing communication between said valve chamber and said venting communication and the first named chamber and for venting the first named chamber, and means responsive to quick service venting of fluid under pressure from said brake pipe to move said slide valve to said one position and upon substantial equalization of brake pipe pressure and an opposing pressure to move said valve means to its second position.

12. An apparatus for controlling brakes on a vehicle comprising, in combination, a brake pipe, a control reservoir, a brake controlling valve device arranged for control by opposing pressures of fluid in said brake pipe and reservoir for controlling application and release of said brakes, valve means responsive to release of fluid under pressure from a chamber to establish a communication between said brake pipe and reservoir for charging said reservoir with fluid under pressure from said brake pipe and operative by fluid under pressure in said chamber to close said communication, a slide valve disposed in a valve chamber in constant communication with said brake pipe and having one position for establishing one communication between said valve chamber and the first named chamber and a second communication for venting fluid under pressure from said valve chamber to effect a quick service reduction in pressure in said brake pipe and having a second position for closing both of the two last named communications and for venting the first named chamber, a spring urging said slide valve to its second named position, a flexible diaphragm connected to said valve subject to brake pipe pressure in said valve chamber and to an opposing fluid at a pressure equal to normal brake pipe pressure and operative upon a reduction in brake pipe pressure sufficient for the opposing pressure to overcome said spring to move said slide valve to its first named position.

13. An apparatus for controlling brakes on a vehicle comprising, in combination, a brake pipe, a control reservoir, a brake controlling valve device arranged for control by opposing pressures of fluid in said brake pipe and reservoir for controlling application and release of said brakes, valve means having one position for establishing a fluid pressure supply communication from said brake pipe to said reservoir and another position for closing said communication, a movable abutment operative by fluid under pressure in one chamber to move said valve means to said other position, another movable abutment operative by fluid under pressure in a second chamber for holding said valve means in said other position, means for moving said valve means to its one position upon venting of fluid under pressure from said one and second chambers, valve means controlled by brake pipe pressure and an opposing pressure and operative upon a reduction in brake pipe pressure below the opposing pressure to supply fluid under pressure to said one chamber and upon substantial equalization of brake pipe pressure and the opposing pressure to vent said one chamber, and means controlled in accordance with the degree of said brake application for supplying fluid under pressure to said second chamber except upon substantial complete release of said brakes and for then venting said second chamber.

14. In a fluid pressure brake apparatus, in combination, a brake pipe, a control reservoir, a brake cylinder device, a brake controlling valve device arranged for control by opposing pressures of fluid in said brake pipe and reservoir for controlling supply and release of fluid under pressure to and from said brake cylinder device, valve means having one position opening said reservoir to said brake pipe and another position for closing such communication, a movable abutment operable by fluid under pressure in a chamber to move said valve means to said other position, another movable abutment adapted to be subjected to pressure of fluid in said brake cylinder device and operative when such pressure is in excess of a chosen degree to hold said valve means in said other position, means for moving said valve means to said one position upon release of fluid under pressure from said chamber and reduction in brake cylinder pressure on said other movable abutment to less than said chosen degree, and valve means controlled by pressure of fluid in said brake pipe and an opposing pressure operative upon a reduction in brake pipe pressure below said opposing pressure to supply fluid under pressure to said chamber and upon substantial equalization of said brake pipe and opposing pressures to release fluid under pressure from said chamber.

15. In a fluid pressure brake apparatus, in combination, a brake pipe, a control reservoir, a brake cylinder device, a brake controlling valve device operative upon a reduction in pressure in said brake pipe relative to that in said reservoir to supply fluid under pressure to said brake cylinder device and upon an increase in brake pipe pressure relative to that in said control reservoir to release fluid under pressure from said brake cylinder device, valve means having one position for establishing a fluid pressure charging communication from said brake pipe to said reservoir and a second position for closing said communication, movable abutment means operable by fluid under pressure to move said valve means to said second position, means for moving said valve means to said one position upon release of fluid under pressure on said abutment means, other valve means operative in response to reduction in brake pipe pressure to supply fluid under pressure to actuate said abutment means, an inshot valve device controlling communication through which fluid under pressure is supplied by said brake controlling valve device to said brake cylinder device controlled by pressure of fluid in said brake cylinder device and operative to close such communication and supply fluid under pressure to said abutment means in response to chosen pressure in said brake cylinder device and to open such communication and release fluid under pressure from said abutment means at all lower pressures in said brake cylinder device.

16. In a fluid pressure brake apparatus, in combination, a brake pipe, a control reservoir, a brake cylinder device, a brake controlling valve device operative upon a reduction in pressure in said brake pipe relative to that in said reservoir to supply fluid under pressure to said brake cylinder device and upon an increase in brake pipe pressure relative to that in said control reservoir to release fluid under pressure from said brake cylinder device, valve means having one position for establishing a fluid pressure charging communication from said brake pipe to said reservoir and a second position for closing said communication, a movable abutment operable by fluid under pressure in a first chamber to move said valve means to its second position, another movable abutment operable by fluid under pressure in a second chamber to hold said valve means in its second position, means for moving said valve means to its first position upon venting both of said chambers, a quick service valve device controlled by brake pipe pressure and an opposing pressure and operative upon a reduction in brake pipe pressure relative to said opposing pressure to effect a quick service reduction in brake pipe pressure and to also supply fluid under pressure to said first chamber and operative upon substantial equalization of said brake pipe and opposing pressures to vent said first chamber, and inshot valve means controlling a communication through which fluid pressure is supplied from said brake controlling valve device to said brake cylinder device and operative by a chosen pressure in said brake cylinder device to close such communication and supply fluid pressure to said second chamber and operative in response to a lesser pressure in said brake cylinder device to open such communication and vent said second chamber.

17. In a fluid pressure brake apparatus, in combination, a brake pipe, a control reservoir, a brake cylinder device, a brake controlling valve device operative upon a reduction in pressure in said brake pipe relative to that in said reservoir to supply fluid under pressure to said brake cylinder device and upon an increase in brake pipe pressure relative to that in said control reservoir to release fluid under pressure from said brake cylinder device, valve means having one position for establishing a fluid pressure charging communication from said brake pipe to said reservoir and a second position for closing said communication, a movable abutment operable by fluid under pressure in a first chamber to move said valve means to its second position, another movable abutment operable by fluid under pressure in a second chamber to hold said valve means in its second position, means for moving said valve means to its first position upon venting both of said chambers, a quick service valve device controlled by brake pipe pressure and an opposing pressure and operative upon a reduction in brake pipe pressure relative to said opposing pressure to effect a quick service reduction in brake pipe pressure and to also supply fluid under pressure to said first chamber and operative upon substantial equalization of said brake pipe and opposing pressures to vent said first chamber, inshot valve means controlling a communication through which fluid pressure is supplied from said brake controlling valve device to said brake cylinder device and operative by a chosen pressure in said brake cylinder device to close such communication and supply fluid under pressure to said second chamber and operative in response to a lesser pressure in said brake cylinder device to open such communication and vent said second chamber, and valve means controlling communication through which said quick service reduction in brake pipe pressure is effected by said quick service valve device and operative by said inshot valve means to open and close such communication upon opening and closing respectively of the communication between said brake controlling valve device and brake cylinder device.

18. In a fluid pressure brake apparatus, in combination, a brake pipe, a control reservoir, a brake controlling valve device arranged for control by opposing pressures of fluid in said brake pipe and reservoir for controlling application and release of brakes, control reservoir cut-off valve means having a normal position for opening two communications of different flow capacity between said brake pipe and reservoir, a check valve in the one of said communications of greater flow capacity for preventing flow of fluid under pressure therethrough from said control reservoir to said brake pipe, said cut-off valve means having a second position for closing both of said communications, means for effecting movement of said cut-off valve means to said second position upon a reduction in brake pipe pressure and for holding same in said cut-off position until a substantial complete release of a brake application, and means for moving said cut-off valve means to said normal position at all other times.

19. In a fluid pressure brake apparatus, in combination, a brake pipe, a control reservoir, a supply reservoir, a brake cylinder device, a brake controlling valve device operative by pressure of fluid in said control reservoir upon a reduction in brake pipe pressure to supply fluid under pressure from said supply reservoir to said brake cylinder device for effecting an application of brakes and operative upon restoration of brake pipe pressure to release fluid under pressure from said brake cylinder device, conveying means for transferring fluid under pressure from said brake pipe to said control and supply reservoirs, a choke for limiting flow of fluid under pressure through said conveying means to said supply reservoir but not to said control reservoir, and a cut-off valve device operative upon initiating an application of brakes to close communication from said brake pipe to said conveying means and upon substantial complete release of said application of brakes to open said communication.

20. In a fluid pressure brake apparatus, in combination, a brake pipe, a control reservoir, a supply reservoir, a brake cylinder device, a brake controlling valve device operative by pressure of fluid in said control reservoir upon a reduction in brake pipe pressure to supply fluid under pressure from said supply reservoir to said brake cylinder device for effecting an application of brakes and operative upon restoration of brake pipe pressure to release fluid under pressure from said brake cylinder device, a control reservoir cut-off valve device comprising a slide valve contained in a chamber in communication with said control reservoir and having a normal position for establishing communications between said chamber, and said brake pipe and supply reservoir, respectively, and having a cut-off position for closing such communications, means for restricting flow of fluid under pressure from said chamber through the one of said communications to said supply reservoir relative to flow of fluid under pressure from said chamber to said control reservoir, and means operative upon initiating an application of brakes to move said slide valve to said cut-off position and upon substantial complete release of said application of brakes to move said slide valve to said normal position.

21. In a fluid pressure brake apparatus, in combination, a brake pipe, a control reservoir, a supply reservoir, a brake cylinder device, a brake controlling valve device operative by pressure of fluid in said control reservoir upon a reduction in brake pipe pressure to supply fluid under pressure from said supply reservoir to said brake cylinder device for effecting an application of brakes and operative upon restoration of brake pipe pressure to release fluid under pressure from said brake cylinder device, a control reservoir cut-off valve device comprising a slide valve contained in a chamber in communication with said control reservoir and having a normal position for establishing communications between said chamber, and said brake pipe and supply reservoir, respectively, and having a cut-off position for closing such communications, a check valve in one of said communications between said brake pipe and said chamber for preventing reverse flow of fluid under pressure from said chamber to said brake pipe, another communication between said chamber and said brake pipe opened by said valve means in said normal position and closed by said valve means in said cut-off position, a choke in said other communication, and means operative upon initiating an application of brakes to move said slide valve to said cut-off position and upon substantial complete release of said application of brakes to move said slide valve to said normal position.

22. In a fluid pressure brake apparatus, in combination, a brake pipe, a control reservoir, a supply reservoir, a brake cylinder device, a brake controlling valve device operative by pressure of fluid in said control reservoir upon a reduction in brake pipe pressure to supply fluid under pressure from said supply reservoir to said brake cylinder device for effecting an application of brakes and operative upon restoration of brake pipe pressure to release fluid under pressure from said brake cylinder device, a control reservoir cut-off valve device comprising a slide valve contained in a chamber in communication with said control reservoir and having a normal position for establishing communications between said chamber, and said brake pipe and supply reservoir, respectively, and having a cut-off position for closing such communications, a check valve in the one of said communications between said brake pipe and said chamber for preventing reverse flow of fluid under pressure from said chamber to said brake pipe, another communication between said chamber and said brake pipe opened by said valve means in said normal position and closed by said valve means in said cut-off position, a choke in said other communication, quick service means responsive to reduction in pressure in said brake pipe to effect a quick service reduction in brake pipe pressure and also to effect movement of said slide valve to said cut-off position, means controlled by brake cylinder pressure to hold said slide valve in said cut-off position as long as the brake cylinder pressure exceeds a chosen degree, and means operative to move said slide valve to normal position upon restoration of brake pipe pressure and reduction in brake cylinder pressure to less than said chosen degree.

23. In a fluid pressure brake apparatus, in combination, a brake pipe, a brake cylinder device, a fluid pressure supply reservoir, brake controlling valve means operative upon a reduction in pressure in said brake pipe to supply fluid under pressure from said reservoir to said brake cylinder device to effect an application of brakes and operative upon restoration of brake pipe pressure to release fluid under pressure from said brake cylinder device, a communication of chosen flow capacity for conveying fluid under pressure from said brake pipe to said reservoir, another communication of greater flow capacity for also conveying fluid under pressure from said brake pipe to said reservoir, and a cut-off valve device controlling the last named communication and operative upon initiating an application of brakes to close same and upon substantial complete release of said application to open same.

24. In a fluid pressure brake apparatus, in combination, a brake pipe, a fluid pressure supply reservoir, a brake cylinder device to which fluid under pressure from said reservoir is adapted to be supplied to effect an application of brakes and from which fluid under pressure is adapted to be released to effect a release of brakes, two communications of different flow capacities for conveying fluid under pressure from said brake pipe to said reservoir, a cut-off valve device controlling the one of said communications of greater flow capacity and having a normal position for opening such communication and a cut-off position for closing such communication, quick service means responsive to a reduction in pressure in said brake pipe to effect a quick service reduction in brake pipe pressure and at the same time effect movement of said cut-off valve device to said cut-off position, means responsive to pressure of fluid in said brake cylinder device for holding said cut-off valve device in said cut-off position as long as the pressure in said brake cylinder device exceeds a chosen degree, and means for moving said cut-off valve device to normal position upon reduction in pressure in said brake cylinder device to less than said chosen degree.

25. In a fluid pressure brake apparatus, in combination, a brake pipe, a brake cylinder device, a fluid pressure supply reservoir, brake controlling valve means operative upon a reduction in pressure in said brake pipe to supply fluid under pressure from said reservoir to said brake cylinder device to effect an application of brakes and operative upon restoration of brake pipe pressure to release fluid under pressure from said brake cylinder device, a communication of chosen flow capacity for conveying fluid under pressure from said brake pipe to said reservoir, another communication of greater flow capacity for also conveying fluid under pressure from said brake pipe to said reservoir, means for preventing back flow of fluid under pressure through both of said communications from said reservoir to said brake pipe, a third communication of less flow capacity than the above named communications providing for flow of fluid under pressure in the direction from said reservoir to said brake pipe, and a cut-off valve device controlling the two of said communications which have the greatest and least flow capacity and having a cut-off position for closing such communications and a normal position for opening such communications, and means operative upon initiating an application of brakes to operate said cut-off valve device to said cut-off position and upon substantial complete release of such application to operate said cut-off valve device to said normal position.

26. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes and application and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a check valve controlled by said abutments for closing communication from said brake pipe to said brake pipe chamber upon a chosen increase in pressure therein over pressure in said control reservoir and for opening such communication upon less differentiable between pressures in said chamber and control reservoir, a supply reservoir charging communication open to said brake pipe chamber, a check valve in the last named communication for preventing reverse flow of fluid under pressure therethrough, and a restricted communication connecting said brake pipe to said brake pipe chamber in by-passing relation to the first named check valve.

27. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a check valve controlled by said abutments for closing communication from said brake pipe to said brake pipe chamber upon a chosen increase in pressure therein over pressure in said control reservoir and for opening such communication upon less differentials between pressures in said chamber and control reservoir, a communication opening said brake pipe chamber to said brake pipe in by-passing relation to said check valve, and a check valve in the last named communication for preventing flow of fluid under pressure therethrough in the direction from said brake pipe to said brake pipe chamber but providing for flow in the opposite direction.

28. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a check valve controlled by said abutments for closing communication from said brake pipe to said brake pipe chamber upon a chosen increase in pressure therein over pressure in said control reservoir and for opening such communication upon less differentials between pressures in said chamber and control reservoir, a gasket in said brake pipe chamber for engagement by the adjacent abutment upon a sufficient reduction in pressure in said brake pipe chamber relative to pressure of fluid in said control reservoir, a supply reservoir charging communication open through said gasket to the abutment engaging face for sealing by the last named abutment upon engagement with said gasket, and a check valve in the last named communication for preventing flow of fluid under pressure therethrough in the direction from said supply reservoir.

29. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a supply reservoir charging communication of a chosen flow capacity opening said brake pipe to said slide valve chamber, a charging communication of greater flow capacity than said supply reservoir charging communication also open to said brake pipe, means for preventing flow of fluid under pressure through said communications in the direction to said brake pipe, a cut-off valve device having a normal position for opening said control reservoir and supply reservoir to said charging communication of greater flow capacity and a cut-off position for disconnecting said reservoirs from such communication, and means operative upon initiating an application of brakes to move said cut-off valve device to said cut-off position and operative only upon substantial complete release of such application of brakes to move said cut-off valve device to said normal position.

30. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a supply reservoir charging communication of a chosen flow capacity opening said brake pipe to said slide valve chamber, another communication of less than said chosen flow capacity opening said brake pipe directly to said supply reservoir, a charging communication of greater flow capacity than said supply reservoir charging communication also open to said brake pipe, means for preventing flow of fluid under pressure through said communications in the direction to said brake pipe, a cut-off valve device having a normal position for opening said control reservoir and supply reservoir to said charging communication of greater flow capacity and a cut-off position for disconnecting said reservoirs from such communication, and means operative upon initiating an application of brakes to move said cut-off valve device to said cut-off position and operative only upon substantial complete release of such application of brakes to move said cut-off valve device to said normal position.

31. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a supply reservoir charging communication of a chosen flow capacity opening said brake pipe to said slide valve chamber, a charging communication of greater flow capacity than said supply reservoir charging communication also open to said brake pipe, means for preventing flow of fluid under pressure through said communications in the direction to said brake pipe, a cut-off valve device having a normal position for opening said control reservoir and supply reservoir to said charging communication of greater flow capacity and a cut-off position for disconnecting said reservoirs from such communication, means for restricting flow of fluid under pressure supplied to said cut-off valve device from said communication of greater flow capacity, to a said supply reservoir relative to flow of fluid under pressure to said control reservoir, and means operative upon initiating an application of brakes to move said cut-off valve device to said cut-off position and operative only upon substantial complete release of such application of brakes to move said cut-off valve device to said normal position.

32. In a fluid pressure brake apparatus, in combination, a brake pipe, a brake cylinder device, a fluid pressure supply reservoir, a control reservoir, a brake controlling valve device comprising slide valve means contained in a chamber open to said supply reservoir and having a brake release position for venting said brake cylinder device to effect a release of brakes, an application position for supplying fluid under pressure from said supply reservoir to said brake cylinder device to apply the brakes, and application lap and release lap positions for, respectively, cutting off supply of fluid under pressure to and release of fluid under pressure from said brake cylinder device, a plurality of movable abutments for controlling said slide valve means controlled by pressure of fluid in said control reservoir acting in opposition to pressure of fluid in said brake cylinder device and in a brake pipe chamber, a supply reservoir charging communication of chosen flow capacity opening said brake pipe to said slide valve chamber, a charging communication of greater flow capacity than said supply reservoir charging communication also open to said brake pipe, means for preventing flow of fluid under pressure through said communications in the direction to said brake pipe, a cut-off valve device having a normal position for opening said control and supply reservoir to said charging communication of greater flow capacity and a cut-off position for disconnecting said reservoirs from such communication, and means operative upon initiating an application of brakes to move said cut-off valve device to said cut-off position and operative only upon substantial complete release of such application of brakes to move said cut-off valve device to said normal position.

33. In a fluid pressure brake apparatus, in combination, a brake pipe, a brake cylinder device operative by fluid under pressure to effect an application of brakes and upon release of fluid under pressure to effect a release of brakes, a fluid pressure supply reservoir from which fluid under pressure is drawn for operating said brake cylinder device, a passageway adapted to be open directly to said brake pipe for conveying fluid under pressure to said reservoir, a check valve in said passageway for preventing reverse flow of fluid under pressure therethrough, valve means controlling communication between said passageway and reservoir operative upon initiating an application of brakes to close said communication, and means for operating said valve means to open said communication only upon substantial complete release of fluid under pressure from said brake cylinder device.

34. In a fluid pressure brake apparatus, in combination, a brake pipe, a brake cylinder device operative by fluid under pressure to effect an application of brakes and upon release of fluid under pressure to effect a release of brakes, a fluid pressure supply reservoir from which fluid under pressure is drawn for operating said brake cylinder device, a passageway adapted to be open directly to said brake pipe for conveying fluid under pressure to said reservoir, a check valve in said passageway for preventing reverse flow of fluid under pressure therethrough, valve means controlling communication between said passageway and reservoir, means responsive to initiating of a quick service reduction in brake pipe pressure to effect operation of said valve means to close said communication, means responsive to pressure of fluid in excess of a chosen degree in said brake cylinder device to hold said valve means closing said communication, and means for operating said valve means to open said communication upon reduction in brake cylinder pressure to a pressure less than said chosen degree.

35. In a fluid pressure brake apparatus, in combination, a brake pipe, a brake cylinder device operative by fluid under pressure to effect an application of brakes and upon release of fluid under pressure to effect a release of brakes, a fluid pressure supply reservoir from which fluid under pressure is drawn for operating said brake cylinder device, a passageway adapted to be open directly to said brake pipe for conveying fluid under pressure to said reservoir, valve means for preventing reverse flow of fluid under pressure through said passageway and for limiting pressure of fluid obtained therethrough in said reservoir to a chosen degree less than in said brake pipe, valve means controlling communication between said passageway and reservoir operative upon initiating an application of brakes to close said communication, and means for operating said valve means to open said communication only upon substantial complete release of fluid under pressure from said brake cylinder device.

36. In a fluid pressure brake apparatus, in combination, a brake pipe, a brake cylinder device, a fluid pressure supply reservoir, a brake controlling valve device responsive to a reduction in brake pipe pressure to supply fluid under pressure from said reservoir to said brake cylinder device to effect an application of brakes and operative upon an increase in brake pipe pressure to vent said brake cylinder device and establish a restricted charging communication from said brake pipe to said reservoir, a passageway having greater flow capacity than said communication adapted to be open directly to said brake pipe, valve means controlling communication between said passageway and said reservoir, means for actuating said valve means to close the respective communication in response to initiation of a reduction in brake pipe pressure and by pressure in said brake cylinder device in excess of a chosen degree, and means for actuating said valve means to open the respective communication upon restoration of brake pipe pressure and reduction in pressure in said brake cylinder device to less than said chosen degree.

37. In a fluid pressure brake apparatus, in combination, a brake pipe, a brake cylinder device, a control reservoir, a fluid pressure supply reservoir, a brake controlling valve device comprising a pile of movable abutments subject to pressure of fluid in said control reservoir acting in opposition to pressure of fluid in said brake cylinder device plus that in said brake pipe effective in a brake pipe chamber at one side of one of said abutments and operative upon a reduction in brake pipe pressure relative to pressure in said control reservoir to supply fluid under pressure from said supply reservoir to said brake cylinder device and operative upon an increase in brake pipe pressure relative to that in said control reservoir to release fluid under pressure from said brake cylinder device, a check valve controlled by said pile of abutments for closing communication between said brake pipe and said brake pipe chamber upon a chosen increase in pressure in said brake pipe chamber over that in said control reservoir and for opening said communication at all other times, a restricted supply reservoir charging communication open to said brake pipe chamber, a passageway having greater flow capacity than said charging communication adapted to be open directly to said brake pipe, valve means controlling communication between said passageway and said control and supply reservoirs and selectively operative to either open said passageway to both of said reservoirs or to disconnect said reservoirs from said passageway and from each other, and means for operating said valve means to open said reservoirs to said passageway only upon substantial complete release of fluid under pressure from said brake cylinder device.

38. In a fluid pressure brake apparatus, in combination, a brake pipe, a brake cylinder device, a control reservoir, a fluid pressure supply reservoir, a brake controlling valve device comprising a pile of movable abutments subject to pressure of fluid in said control reservoir acting in opposition to pressure of fluid in said brake cylinder device plus that in said brake pipe effective in a brake pipe chamber at one side of one of said abutments and operative upon a reduction in brake pipe pressure relative to pressure in said control reservoir to supply fluid under pressure from said supply reservoir to said brake cylinder device and operative upon an increase in brake pipe pressure relative to that in said control reservoir to release fluid under pressure from said bake cylinder device, a check valve controlled by said pile of abutments for closing communication between said brake pipe and said brake pipe chamber upon a chosen increase in pressure in said brake pipe chamber over that in said control reservoir and for opening said communication at all other times, a restricted supply reservoir charging comunication open to said brake pipe chamber, a first passageway having greater flow capacity than said charging communication open to said brake pipe chamber, a second passageway having a flow capacity equal at least to that of said first passageway and open at all times directly to said brake pipe, a third passageway connected to both said first and second passageways, a removable plug adapted to close communication through said first passageway, valve means controlling communication between said third passageway and both of said reservoirs and selectively operative to either open both of said reservoirs to said third passageway or to disconnect said reservoirs from said third passageway and from each other, and means for operating said valve means to open said reservoirs to said third passageway only upon substantial complete release of fluid under pressure from said brake cylinder device.

39. In a fluid pressure brake apparatus, in combination, a brake pipe, a brake cylinder device, a control reservoir, a brake controlling valve device arranged for control by opposing pressures of fluid in said brake pipe and reservoir and operative upon a reduction in pressure of fluid in said brake pipe relative to that in said reservoir to supply fluid under pressure to said brake cylinder device and upon an increase in pressure in said brake pipe relative to that in said reservoir to release fluid under pressure from said brake cylinder device, valve means operable by fluid under pressure to close communication between said brake pipe and said reservoir and upon release of fluid under pressure to open said communication, and means controlled by pressure of fluid in said brake pipe and in said brake cylinder device operative to provide fluid under pressure for operating said valve means in response to initiation of a reduction in brake pipe pressure and so long as pressure of fluid in said brake cylinder device is in excess of a chosen degree.

40. In a fluid pressure brake apparatus, in combination, a brake pipe, a brake cylinder device, a control reservoir, a brake controlling valve device arranged for control by opposing pressures of fluid in said brake pipe and reservoir and operative upon a reduction in pressure of fluid in said brake pipe relative to that in said reservoir to supply fluid under pressure to said brake cylinder device and upon an increase in pressure in said brake pipe relative to that in said reservoir to release fluid under pressure from said brake cylinder device, valve means operable by fluid under pressure to close communication between said brake pipe and said reservoir and upon release of fluid under pressure to open said communication, a valve device operative in response to initiation of reduction in pressure in said brake pipe to supply fluid under pressure to said valve means to actuate same, and means responsive to a chosen pressure of fluid in said brake cylinder device to also supply fluid under pressure to said valve means to actuate same, and in response to a lesser pressure of fluid in said brake cylinder device, in releasing fluid under pressure therefrom, to release actuating fluid under pressure from said valve means.

41. In a fluid pressure brake apparatus, in combination, a brake pipe, a brake cylinder device, a control reservoir, a brake controlling valve device arranged for control by opposing pressures of fluid in said brake pipe and reservoir and operative upon a reduction in pressure of fluid in said brake pipe relative to that in said reservoir to supply fluid under pressure to said brake cylinder device and upon an increase in pressure in said brake pipe relative to that in said reservoir to release fluid under pressure from said brake cylinder device, valve means operable by fluid under pressure to close communication between said brake pipe and said reservoir and upon release of fluid under pressure to open said communication, a quick service valve device operative in response to a reduction in brake pipe pressure to effect a quick service venting of fluid under pressure from said brake pipe to said valve means to actuate same, and means responsive to a chosen pressure of fluid in same brake cylinder device to establish communication from said brake cylinder device to said valve means to provide fluid under pressure for operating said valve means and responsive to a lesser pressure of fluid in said brake cylinder device to close the last named communication and open a vent from said valve means for releasing fluid under pressure therefrom.

42. In a fluid pressure brake apparatus, in combination, a brake pipe, a brake cylinder device, a control reservoir, a brake controlling valve device arranged for control by opposing pressures of fluid in said brake pipe and reservoir and operative upon a reduction in pressure of fluid in said brake pipe relative to that in said reservoir to supply fluid under pressure to said brake cylinder device and upon an increase in pressure in said brake pipe relative to that in said reservoir to release fluid under pressure from said brake cylinder device, valve means operable by fluid under pressure to close communication between said brake pipe and said reservoir and upon release of fluid under pressure to open said communication, a quick service reservoir, a quick service valve device operative in response to a reduction in brake pipe pressure to release fluid under pressure from said brake pipe to said quick service reservoir, to effect a quick service reduction in brake pipe pressure, and also to said valve means to actuate said valve means, a vent for releasing fluid under pressure from said reservoir, and an inshot device controlled by pressure of fluid in said brake cylinder device operative in response to a brake cylinder pressure in excess of a chosen degree to close said vent and supply fluid under pressure from said brake cylinder device to said valve means to actuate same and of a lesser degree to open said vent and release actuating fluid under pressure from said valve means.

43. In a fluid pressure brake apparatus, in combination, a brake pipe, a brake cylinder device, a fluid pressure supply reservoir, brake controlling valve means operative upon a reduction in pressure in said brake pipe to supply fluid under pressure from said reservoir to said brake cylinder device to effect an application of brakes and operative upon restoration of brake pipe pressure to release fluid under pressure from said brake cylinder device, a communication of chosen flow capacity for conveying fluid under pressure from said brake pipe to said reservoir, another communication of different flow capacity for also conveying fluid under pressure from said brake pipe to said reservoir, and a cutoff valve device controlling the last named communication and operative upon initiating an application of brakes to close same and upon substantial complete release of said application to open same.

References Cited in the file of this patent

UNITED STATES PATENTS

| | | |
|---|---|---|
| 1,693,943 | Thomas | Dec. 4, 1928 |
| 1,881,221 | Neveu | Oct. 4, 1932 |
| 2,032,145 | Nelson | Feb. 25, 1936 |
| 2,032,154 | Simmons | Feb. 25, 1936 |
| 2,033,229 | Campbell | Mar. 10, 1936 |
| 2,050,783 | Campbell | Aug. 11, 1936 |
| 2,058,012 | Guillemin | Oct. 20, 1936 |
| 2,071,741 | Gnavi | Feb. 23, 1937 |
| 2,201,574 | Cook et al. | May 21, 1940 |
| 2,276,927 | Cristen | Mar. 17, 1942 |